United States Patent [19]
Thornton

[11] Patent Number: 5,388,527
[45] Date of Patent: Feb. 14, 1995

[54] MULTIPLE MAGNET POSITIONING APPARATUS FOR MAGNETIC LEVITATION VEHICLES

[75] Inventor: Richard D. Thornton, Concord, Mass.

[73] Assignee: Massachusetts Institute of Technology, Cambridge, Mass.

[21] Appl. No.: 63,920

[22] Filed: May 18, 1993

[51] Int. Cl.$^6$ ............................................. B60L 13/04
[52] U.S. Cl. .................................. 104/284; 104/285; 104/286
[58] Field of Search ............... 104/281, 284, 285, 286

[56] References Cited

U.S. PATENT DOCUMENTS

| | | |
|---|---|---|
| 3,470,828 | 10/1969 | Powell et al. |
| 3,662,689 | 5/1972 | Kawabe et al. ................ 104/286 X |
| 3,771,033 | 11/1973 | Matsui et al. .................... 104/281 X |
| 3,841,227 | 10/1974 | Fink ................................ 104/286 X |
| 3,903,809 | 9/1975 | Miericke et al. ................ 104/286 X |
| 3,951,075 | 4/1976 | Miericke et al. .................... 104/285 |
| 5,213,047 | 5/1993 | Fujiwara et al. .................... 104/281 |
| 5,222,436 | 6/1993 | Coffey ............................ 104/286 X |

OTHER PUBLICATIONS

"Whey the U.S. Needs a Maglev System" Technology Review, Apr. 1991, pp. 30-42, R. D. Thornton.
"JR Group probes maglev frontiers," Railway Gazette International, Jul. 1990, pp. 537-539, by Hisashi Tanaka.
"Electrodynamic Forces of the Cross-Connected Figure-Eight Null-Flux Coil Suspension System," by J. L. He, D. M. Rote and H. T. Coffey of the Center for Transportation Research Energy Systems Division of Argonne National Laboratory (Published after Jul. 3, 1992).
"Development of Maglev Transportation in Japan: Present State and Future Prospects," by E. Masada of The University of Tokyo (1993).

Primary Examiner—Robert J. Oberleitner
Assistant Examiner—S. Joseph Morano
Attorney, Agent, or Firm—Steven J. Weissburg

[57] ABSTRACT

A positioning apparatus for a maglev vehicle includes multiple vehicle magnets. The magnets are paired For a suspension configuration, the magnets are one above the other, with a plurality of pairs arranged along the length of the vehicle. The poles are of adjacent magnets are opposite each other, transverse of the guideway. The guideway carries a conductor that is located symmetrically with respect to the two vehicle magnets. Among other things, the conductor may be a ladder, discrete coils or a helical winding. As the vehicle moves along the guideway, the voltages are induced in the circuits of the guideway conductor by the moving vehicle magnetic fields. If the vehicle is at a symmetry position with respect to the guideway, no current is induced in the guideway conductors because the magnetic fields from the pair of magnets cancel each other. However, if, as is typical, the vehicle is away from the symmetry position, such is the case due to the force of gravity, a current is induced that interacts with the vehicle magnets, to tend to push the vehicle toward the symmetry position. Thus, the vehicle is supported against gravity. The invention may also be used in a guidance configuration, by rotating the above described structure 90°, so that the magnet poles are aligned vertically.

28 Claims, 16 Drawing Sheets

MULTIPLE MAGNET POSITIONING APPARATUS FOR MAGNETIC LEVITATION VEHICLES

The present invention relates generally to magnetic levitation of ground transportation vehicles, such as trains. It relates more specifically to an apparatus for maintaining such a vehicle at a controlled location, either above a guideway or from side-to-side relative to a guideway. The invention relates specifically to a suspension or guidance apparatus for a magnetic levitation vehicle, using a group of paired magnets where magnetic flux is canceled when the vehicle is at a desired suspension or guidance location, but where dislocation from the desired location gives rise to restoring forces.

BACKGROUND

For over twenty years, much attention has been given to passenger-carrying ground vehicles, capable of traveling at high speed, e.g. 100 to 300 miles per hour (160 to 480 km/hour). There is a significant need for such transportation between neighboring cities of high population density where automobile and air transport are not efficient, such as in the northeast corridor of the United States. The United States also has need for such transportation over longer distances and in areas of more diffuse population.

Express Mail Label No. TB292300679US

Magnetic levitation ("Maglev") is any system where a vehicle is suspended (and usually guided) by electromagnetic forces, rather than by wheels or aerodynamic forces. Electromagnetic forces typically provide propulsive force also. It has been suggested that Maglev travel would be as fast or faster than airplanes for distances of less than 600 miles (1000 km.).

Maglev has advantages over other modes of travel. It is powered by electricity, which, in the United States, is only 30% dependent on petroleum. Further, it would use only a quarter to a half as much energy per passenger-mile traveled as short haul jet aircraft and private automobiles with two passengers. Maglev also has relatively low environmental impact, making less noise than any other system for the speed and requiring less land than any other mode per unit capacity. Maglev may also be as safe or safer than other modes of travel. Elevated guideways will be used so the vehicle will not encounter other vehicles, such as automobiles, at grade crossings. No on-board fuel is required, minimizing fire accidents. The vehicle does not touch the guideway, thereby minimizing wear and the effects of weather related accidents. For a more detailed discussion of the prospects for Maglev, see generally, R. D. Thornton, "Beyond Planes, Trains and Automobiles, Why the U.S. Needs a Maglev System," pp. 32–42, TECHNOLOGY REVIEW, (April 1991).

FIG. 1A shows schematically a Maglev vehicle 102 traveling along a monorail guideway 104. A first car 106 and a second car 108 are shown, however, numerous cars are possible. The guideway 104 is continuous, extending along the entire route that the vehicle will travel. The guideway may be elevated above the ground, so that the vehicle is on the order of 10 to 30 feet (3–9 m.) above the ground, or at grade, or below, depending on local conditions.

A maglev vehicle must be spaced away from its guide surface, so that there is no friction or other drag force arising from such contact. In fact, this reduced drag aspect of Maglev transportation is one of its principal attractions. Thus, one aspect of a Maglev system is the suspension apparatus that supports the vehicle at the desired vertical location for operation. The suspension maintains the vertical gap V, as desired. The suspension forces should also serve to dampen out any upward motion of the vehicle, caused by track irregularities. Thus, the vehicle moves up and down, generally along an axis V of vertical perturbation (FIG. 1B), due to the effects of gravity and track irregularities. The suspending forces arise due to the interaction between magnetic fields resulting from superconducting magnets, typically carried by the vehicle, and conductors fixed to the guideway. Typically, the power for the suspension system comes from the forward motion of the vehicle. Therefore, when the vehicle is at rest or moving slowly, alternate means of suspension are used.

Rather than using a monorail guideway, designs have been proposed where the guideway is a channel. In any case, it is typical among the various Maglev designs under consideration, for the vehicle to travel at a certain vertical distance V above the guideway, whether a monorail or a channel. This distance may be measured between the top of a monorail and the bottom of the undercarriage 110. If the train travels in a channel, such as that shown in U.S. Pat. No. 3,470,828, issued in 1969 to J. Powell and G. Danby, the distance may be measured between the bottom of the vehicle and the bottom of the channel, or from outriggers for housing superconducting magnets and some aspect of the channel wall.

If power and efficiency are not affected, it is generally more desirable to have a larger vertical gap V, rather than a smaller gap. A larger gap minimizes the danger of damage from foreign articles resting on top of the guideway. Further, a larger gap minimizes the likelihood that the vehicle will contact the guideway as a result of perturbations in the vehicle travel.

Typically, when the vehicle is at rest, some part of it, either wheels, or skids, etc., comes into contact with a portion of the guideway. Under most designs, as the vehicle begins to move forward, the suspension system begins to take effect. At that point, the wheels or skids may be retracted, as in an airplane, thereby resulting in no physical contact between the vehicle and the guideway. According to other schemes, the suspension system of the vehicle will lift it from a relatively low rest position to a relatively higher moving position. It has also been proposed to use air cushions, either generated by the vehicle or the guideway, for instance at a station, to suspend the vehicle when at rest or when, for other reasons, the electromagnetic suspension system is not operational.

Maglev depends on using very powerful magnets to provide the lift and guidance, and usually the propulsive force as well. The magnetic forces are generated by high, persistent electric currents circulating in loops through superconducting materials. The superconducting materials must be kept at very low temperatures, typically below 10° K. The temperature is maintained by closed cycle cryogenic refrigeration units or in stored cryogenic fluids. With the advent of high temperature superconductors, it may be possible to operate under superconducting conditions with temperatures as high as 77° K., or even higher, depending on future developments in the superconducting field. The superconducting current carrying loops are referred to in this specification as "magnets," as their principal relevance to the invention is the way in which the magnetic field from the superconducting current interacts with conductive components of the guideway.

There are two basic Maglev methods for providing upward vertical forces, known as levitation or suspension. The first is known as "attractive," or "electromagnetic suspension" or "EMS." The second is known as "repulsive," or "electrodynamic suspension" or "EDS."

EMS suspension relies principally on attractive force. EMS systems are unstable unless the current in the magnets can be varied rapidly and widely via electronic control. With non-superconducting vehicle magnet conductors, this EMS suspension requires a very narrow air gap between the guideway or guiderail and the vehicle. The practical gap for non-superconducting EMS suspension is three-eighths of an inch (1 cm.) or less, to maintain acceptable power consumption, vehicle weight and guideway cost.

In contrast, an EDS suspension system is inherently stable. The current induced in the guideway increases as the gap shrinks, thereby increasing the repulsive force, and providing steady suspension. Using EDS suspension, the magnetic field can be constant, and thus can be supplied by superconducting magnets, allowing a gap of between two to six inches (five to thirty-eight cm.).

EDS suspension systems proposed to date have drawbacks. Typically, they have been less efficient and have required more power than existing EMS suspension designs. Efficiency is defined in terms of suspension force per unit of guideway power dissipation. Another problem arises because powerful superconducting magnets produce powerful magnetic fields. It is believed that exposing humans to such magnetic fields may be harmful. Therefore, it is important to minimize such exposure.

In order to overcome the efficiency drawbacks, the conductive components of the guideway which interact with the magnetic field of the magnets can be specially designed. However, it is important to minimize the cost of the guideway, since the guideway extends for miles and miles and constitutes a significant capital cost. In fact, costs savings in the guideway are typically more valuable than cost savings in the vehicle or magnets.

It has been proposed to use a solid sheet for the guideway conductors. A relatively thick and wide sheet of conductor can be located adjacent, typically below, the conductors of a superconducting magnet, which has its main magnetic field aligned vertically. Induced guideway currents would flow in the sheet primarily under the region of the magnet conductors. However, this system is inefficient due to a skin effect phenomena. This results in a high percentage of the power delivered for suspension purposes being dissipated in the continuous sheet of the guideway without providing any lift force.

Additional problems that arise from a continuous sheet are high drag at low speeds, which can cause overheating of the guideway in low speed regions, such as near stations. The drag also requires wheels at speeds less than 30 m/s (67 mph). Wheels are undesirable for many reasons, including reliability, and the requirement that all sections of the guideway must be able to support concentrated loads that wheels create. Further, there would be little magnetic damping of vertical motion, so other shock absorbing means are required. Also, no downward suspension forces are generated, which raises instability problems. A high, induced current in the guideway induces a high reaction magnetic field and AC losses in the superconducting magnets when the vehicle operates at high speed over a guideway that is not perfectly smooth. Also, mounting problems arise due to thermal expansion.

Discrete loops can also be used, which can be designed to provide somewhat lower losses than a continuous sheet.

Ladder-like configurations have also been proposed for guideway conductors in suspension systems. A ladder is analogous to the rotor of a squirrel cage induction motor cut and rolled out flat. It is possible to reduce the cost of the guideway using a ladder of solid conductors. However, high reaction magnetic fields also typically arise in solid conductors of a ladder, resulting in the same efficiency problems as arise with a continuous sheet. Further, the efficiency is worse than with either a continuous sheet or discrete loops.

An EDS suspension design proposed in Japan uses a horizontal gap between vehicle magnets and the side wall of a U-shaped guideway channel. The bottom portion of the vehicle carries the magnets on a side face of the vehicle, which faces the side wall of the channel. A magnetic force arises as a shear force between the vertical surfaces of the vehicle magnetic coil and a series of special conductive loops in the guideway side wall. The guideway loops are in the form of figure-eights.

This is a variation of a system proposed by Danby and Powell in 1966, described in the U.S. Pat. No. 3,470,828 identified above. The Danby and Powell system was used for guiding the vehicle laterally between the sides of the channel. The coils and loops were rotated 90°, so that the gap was vertical. However, the principal is the same.

The Japanese EDS design is more efficient than EDS systems that use discrete loops in the guideway. However, it is more expensive to make the guideway, given the more complicated structure of the figure-eight loops. FIG. 2 shows the side wall system schematically. A portion 202 of the vehicle is shown riding within a channel. The vehicle travels in the direction of arrow F. The right (starboard) side wall 204 of the channel is shown. The left (port) side wall is not shown, for clarity. The major portion of the vehicle, including the passenger compartment, would extend above the portion 202 shown. The passenger compartment may or may not be above the maximum vertical extent of the sidewall 204.

A representative vehicle magnet 206 is formed of a loop or coils of loops of superconducting material, having a persistent current, for instance as indicated by the arrows circling its perimeter. In the full vehicle, several such magnets would be aligned along the length of each vehicle car. The persistent current generates a magnetic field having a polarity conventionally designated as north or N. A series of figure-eight loops 210 are fixed to the side wall along the entire length of the guideway. Two representative figure-eight loops $210_a$ and $210_b$ are shown on the left side of the guideway. The figure-eight loops supported by the right side 204 of the guideway are shown partially in phantom. The figure-eights are each conductive around their loop, so that a single conductive loop folded into two lobes, is formed. No external current or power is provided to the figure-eight loops. Current does arise in them, as described below, induced by virtue of the vehicle coils 206 moving past the figure-eight loops 210.

The means by which the Japanese EDS suspension system functions is as follows. A vertical equilibrium position for the vehicle relative to the guideway is established, in which current is induced in the guideway figure-eight loops 210 which creates a magnetic field that reacts with the magnetic field from the vehicle coils to support the vehicle at a desired height.

If the vehicle magnet coil 206 is centered between the two lobes of the figure-eight 210, the magnetic flux field of the single magnet coil 206 induces equal and opposite voltages in the two lobes of an individual figure-eight, for instance $210_a$. Thus, no net current results in the guideway figure-eight loops 210, if the vertical position of the vehicle coil 206 remain symmetrically located between the two lobes. (This is typically not the case.) If the vehicle falls or rises relative to the guideway along the axis of vertical perturbation, either the upper or the lower lobe of each of the figure-eight coils 210 would be more tightly coupled to the vehicle magnet 206 than the other lobe in the same figure-eight. This would induce a net unbalanced voltage between the upper and lower figure-eight lobes, thereby producing a circulating current within the figure-eight loop 210. In accordance with Lenz's law, the magnetic field arising due to the circulating current in the figure-eights 210 would interact with the field due to the vehicle coil 206, and provide a restoring force, tending to return the vehicle body 202 to the vertical equilibrium position.

Thus, if the vehicle 202 is at a vertically symmetric position relative to the guideway figure-eight, as it travels along in direction F, no current circulates in the figure-eight loop 210. This is illustrated schematically in FIG. 3A, which shows schematically in cross section a vehicle coil 206, composed of the upper and lower conductor sections $206_u$ and $206_L$ respectively. Current is indicated flowing in the direction shown in FIG. 3, by the "+" symbol in conductor section $206_u$, indicating current flowing into the page, and the "−" symbol in conductor section $206_L$, indicating current flowing out of the page. The conductors that make up the figure-eight, $210_u$, $210_n$, $210_m$, and $210_L$, carry no current, as indicated. (It will be understood that, typically, the vehicle is not at this vertically symmetric position, but, rather, rides below it.)

However, if the vehicle were to be located below the symmetric position, as shown schematically in FIG. 3B, the currents in the vehicle conductor would remain, but a current would be induced in the figure-eight 210, as indicated, which would generate a magnetic field that would interact with the magnetic field generated by the vehicle coil 206 to push the vehicle back upward. (It is also appropriate to regard the magnetic field as interacting directly with the current induced in the figure-eight coil.) The mutual inductance between the vehicle coil 206 and the figure-eight 210 rises very significantly with displacement from equilibrium. This rapid increase contributes to high efficiency.

Similarly, if the vehicle were to be jolted upward above the symmetric position, the current induced in the figure-eight 210 would generate a magnetic field that would oppose the relative upward motion, thereby bringing the vehicle back up toward the vertically symmetric position.

Because the vehicle has mass, it is constantly being pulled downward, away from the symmetric position, by gravity. Being away from the symmetric position, currents are induced in the guideway figure-eight loops 210, which generate a magnetic field that interacts with the vehicle magnetic field, tending to resist the gravity force, thus supporting the vehicle.

Despite the foregoing operation, the Japanese EDS suspension system is relatively costly to fabricate, align and install in the guideway the many figure-eight loops 210 that would be needed. Further, the figure-eight configuration uses relatively more metal than is desirable, for cost purposes.

There is also a need in Maglev applications to guide a vehicle transverse of the guideway (i.e., laterally, from port to starboard (left to right)). As the vehicle travels along, it may oscillate transverse of the guideway, generally along a horizontal transverse axis of perturbation T (FIG. 1B). As is mentioned above, a system has been proposed in the Danby and Powell Patent which is similar to the Japanese EDS suspension system described above. However, the guidance system is rotated by 90° with respect to the vertical. When the vehicle is centered no current arises in the guideway figure-eights, which are oriented generally with the loops in horizontal planes. It is desirable to use a guidance system which uses the same vehicle magnets as are used for the suspension apparatus.

Thus, there is a need for a system to suspend a Maglev vehicle at a desired equilibrium height or to guide such a train along a guideway, in an energy efficient manner, which minimizes overall cost. Related to this objective is to facilitate the manufacture and repair of the guideway by simplifying its construction. It is also desirable to operate such a suspended Maglev vehicle at a reasonably large gap distance away from the guideway, thus ensuring that the vehicle never touches the guideway, even in worst case combinations of turn radii, vehicle speed and wind forces. Another object of the invention is to configure the superconducting magnets to minimize the magnetic field that will pass through the passenger compartment. There is also a need to suspend or guide a Maglev vehicle in such a way that permits energy efficient use of the superconducting magnets for propulsion of the vehicle and for guidance of the vehicle with respect to its lateral position relative to the guideway. Another object of the invention is to suspend a Maglev vehicle using magnetic forces, while the vehicle is traveling at slow speeds, without wheels. Yet another aspect of the invention is to use the same vehicle magnets for both the vehicle guidance apparatus and the suspension apparatus.

SUMMARY

According to a preferred embodiment of the invention, the invention is an apparatus for positioning a ground vehicle that travels along a guideway at a selected position along an axis of perturbation relative to the guideway. The apparatus includes first and second vehicle magnets and, fixed to the guideway, conductors for generating a guideway magnetic field to interact with the vehicle magnetic fields. The vehicle magnets and the guideway conductors are arranged such that if the vehicle is at a first position relative to the guideway, equal and opposite voltages are induced in the guideway conductors by each of the vehicle magnets, whereby no current is generated in the guideway conductor. However, if the vehicle is at a different position, unequal voltages are induced in the guideway conductors by each of the vehicle magnets, whereby a current is generated in the guideway conductor that interacts with the vehicle magnetic fields to apply a force to the vehicle that tends to urge the vehicle toward the first position. The invention may be used for suspension or guidance of a vehicle.

According to another preferred embodiment the invention is an apparatus for positioning a ground vehicle that travels along a guideway at a preselected position relative to the guideway. Carried by the vehicle, is a first means for generating a vehicle magnetic field, having its poles aligned transverse of the guideway. A second magnetic means is also carried by the vehicle, adjacent to and vertically above the first, having its poles aligned parallel to and opposite to those of the first. The guideway may carry conductors to interact with the vehicle magnetic fields to maintain said vehicle at the vertical position. The conductor may be a ladder, discrete coils, or a helical meander winding. The guideway may also carry at least one set of figure-eight coils, arranged with one of the two lobes of the figure-eight lying above the other in a vertical plane parallel to the direction of travel of the vehicle. The figure-eight coil operates in cooperation with a companion figure-eight coil on the other side of the guideway to guide the vehicle transverse of the guideway.

According to yet another preferred embodiment, the invention is an apparatus for positioning a ground vehicle that travels along a guideway along an axis of perturbation. The apparatus includes an electrically conductive ladder, fixed to the guideway and having at least two rails and a plurality of rungs. The ladder is arranged with the rails generally parallel to the direction of vehicle travel and the rungs generally parallel to the axis of perturbation. The ladder is made from a plurality of electrically conductive sheets laminated together and electrically insulated from each other, arranged with their thin dimension perpendicular to the direction of vehicle travel and perpendicular to the axis of perturbation.

According to another embodiment, the invention is an apparatus for positioning a ground vehicle that travels along a guideway at a selected position along an axis of perturbation relative to the guideway. The vehicle carries a first magnet, having its poles aligned perpendicular to the travel path of the vehicle and to the axis of perturbation and a second magnet, with its poles aligned parallel and opposite to the poles of the first magnet. The second magnet is adjacent to the first, and spaced away along the axis of perturbation. Again, the guideway may carry conductors to interact with the vehicle magnetic fields to maintain said vehicle at the vertical position. The conductor may be a ladder, discrete coils, or a helical meander winding. The conductors may be oriented either vertically or horizontally, depending on whether the positioning device is used for suspension, or guidance.

Another preferred embodiment of the invention is an apparatus for positioning a ground vehicle that travels along a guideway at a selected lateral position relative to the guideway. Again, two magnets are arranged in the vehicle with their poles parallel and opposite. However, their poles are arranged vertically, and the magnets are spaced along the transverse direction of the train.

BRIEF DESCRIPTION OF THE FIGURES

These and other features, aspects, and advantages of the present invention will become better understood with regard to the following description, appended claims and accompanying drawings, where:

DETAILED DESCRIPTION

Figure 4:
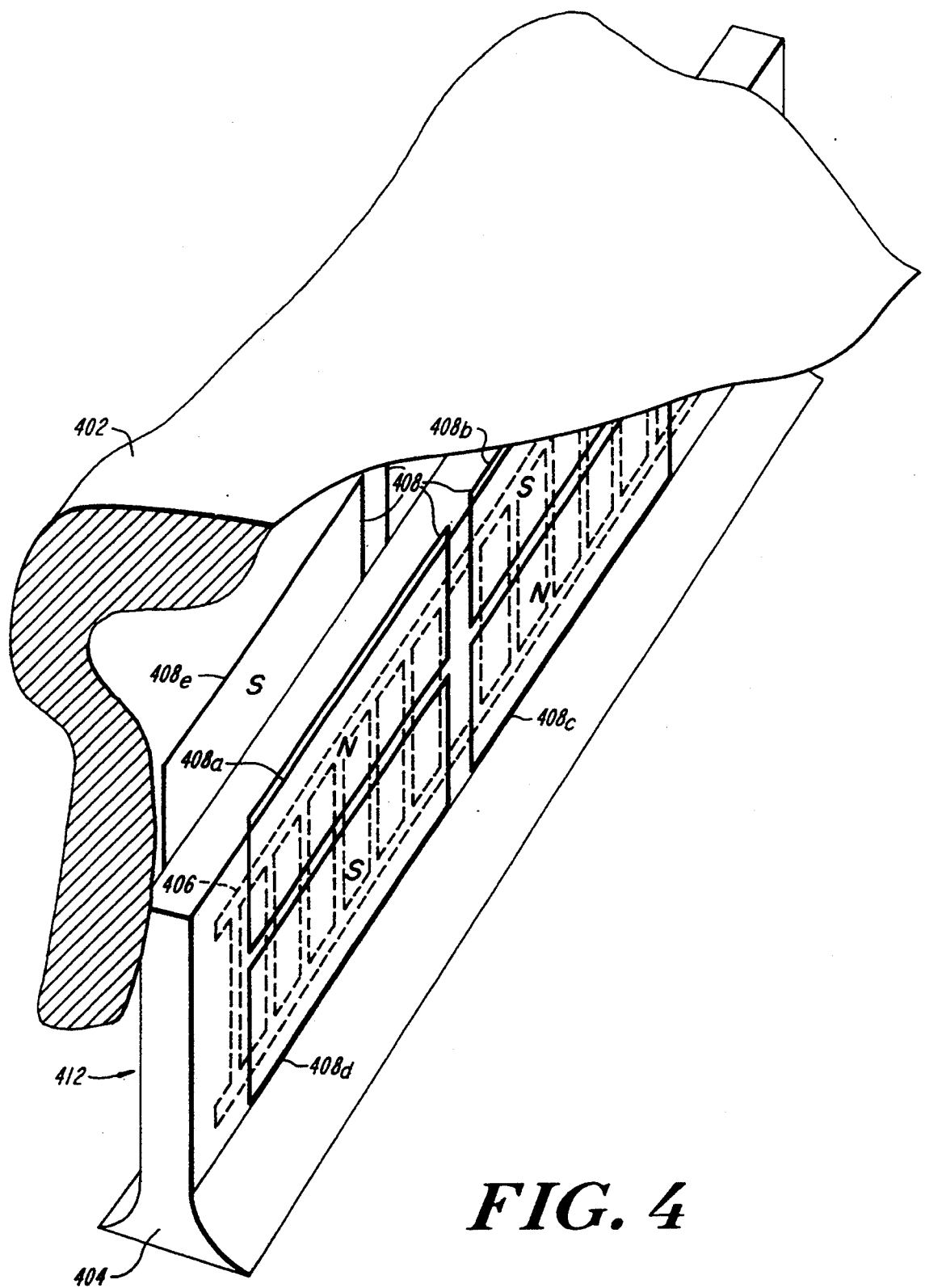
FIG. 4 shows schematically, a guideway monorail carrying the suspension ladder conductor of the invention surrounded by the portion of the vehicle that houses the vehicle magnets, with some parts cut away.

A preferred embodiment of the invention is shown schematically in FIG. 4. The invention includes both a suspension configuration and a guidance configuration, which use the same type of guideway conductors. Both work on the same principal, with the guidance configuration being basically rotated 90° from the suspension configuration. This specification describes the invention principally through the example of the suspension configuration. However, the guidance configuration is treated, and is considered an important variation of the invention. The invention also includes a different guidance configuration, which uses figure-eight guideway conductors, which enables using the same magnets for guidance as are used for suspension. This figure-eight guidance configuration is described before the guidance configuration that uses a guideway conductor that is of the same form as that used for the suspension configuration of the invention.

Figure 1A:
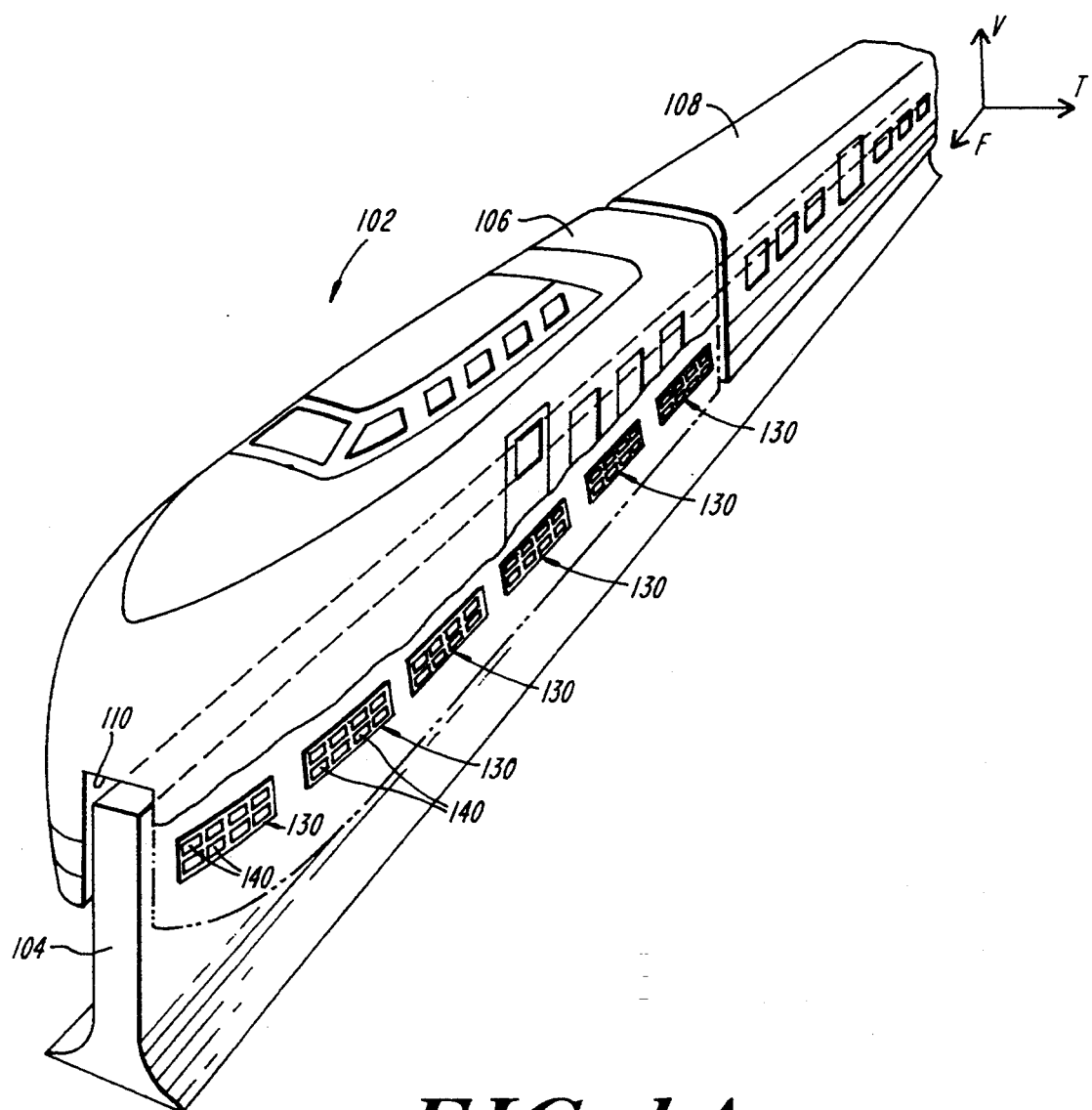
FIG. 1A shows schematically a Maglev vehicle and monorail guideway configured to be suspended by the apparatus of the invention, with part of the hull cut away to show the vehicle superconducting coils.
Figure 1B:
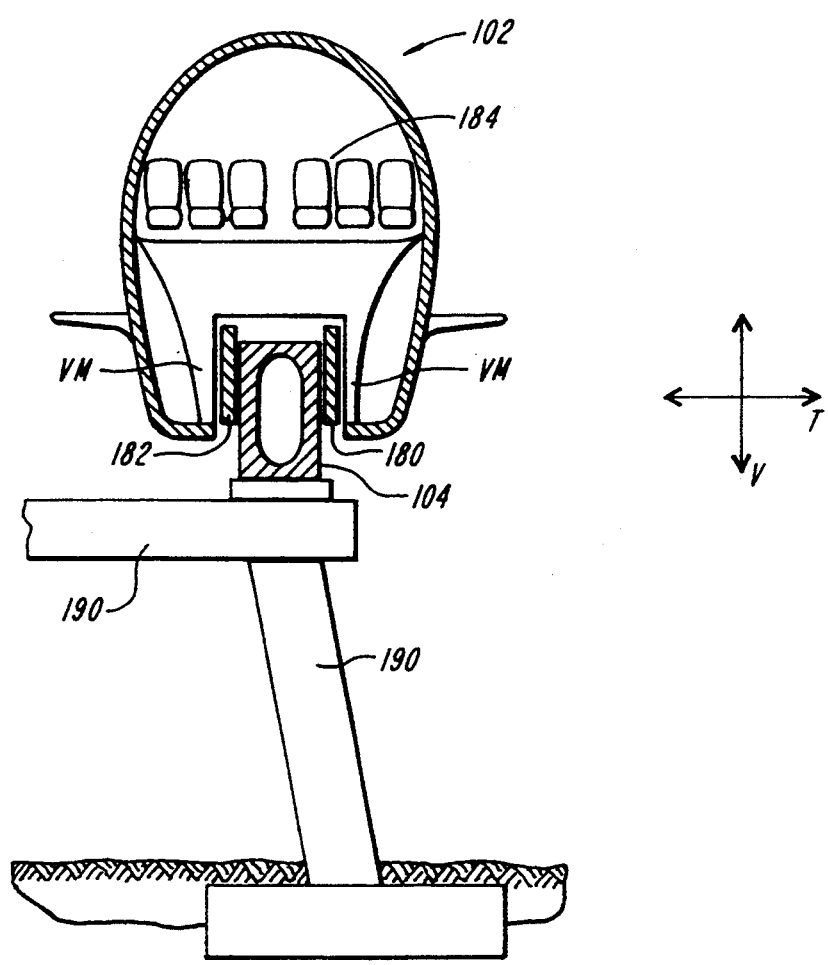
FIG. 1B shows schematically in cross-section a Maglev vehicle and monorail guideway and guideway support girders, for use in connection with the suspension apparatus of the invention.

The suspension configuration of the apparatus for a Maglev vehicle includes a monorail guideway 404, upon which is mounted a ladder-like guideway conductor 406. An identical ladder conductor 412 is mounted on the other face of the monorail 404, however it is not visible in the view shown in FIG. 4. The relation between the vehicle, the guiderail 104 and its supporting girders is also illustrated with reference to FIG. 1B, showing a representative car 102, guiderail 104 and other features in cross-section. The port and starboard guiderail ladder conductors 406 and 412 are attached to the guiderail 104 on either side in port mounting unit 180 and starboard mounting unit 182, respectively.

The vehicle is shown only schematically in FIG. 4 by a representation of the hull 402, most of which is cut away. The vehicle 102 wraps around the monorail 404. The vehicle carries a series of groups 140 (FIG. 1A) of superconducting magnet coils 408 (FIG. 4). (The superconducting coils are referred to below alternatively as "vehicle magnets" or "superconducting coils.") The vehicle magnets are arranged in upper and lower rows, generally at locations VM (FIG. 1B) on either side of the monorail 404. Typically, the magnets are arranged in groups 140 (FIG. 1A) of at least four individual coils 408, that is two pairs of upper and lower magnets, arranged adjacent each other along the length of the vehicle, as shown in FIG. 4. The group 140 of four magnets is referred to herein alternatively as a 4-pack or as an "octopole" (octopole, because each superconducting coil has two poles: N and S). The 4-packs 140 are arranged as shown in FIG. 4, with one on one side of the vehicle, facing a first face, for instance the left (or port) face, of the monorail, and the other 4-pack facing the other (starboard) face of the monorail. Such a group of eight superconducting coils is referred to as a "bogie," analogous to a grouping of wheels on a steel rail train, a truck or an airplane.

The individual magnets 408 are arranged so that adjacent magnets present opposite polarities to the conductor in the guiderail. For instance, the diagonally located magnets $408_a$ and $408_c$ present a N pole toward the guiderail, while the magnets $408_b$ and $408_d$ on the other diagonal present a S pole toward the guiderail. (It should be noted that the pole indications "N" and "S" shown in FIG. 4 indicate the pole presented to the guiderail, rather than the pole that would be presented to the observer of the figure.) Magnet $408_a$, presenting a north pole, is adjacent to magnets $408_b$ and $408_d$, both presenting south poles.

Figure 5:
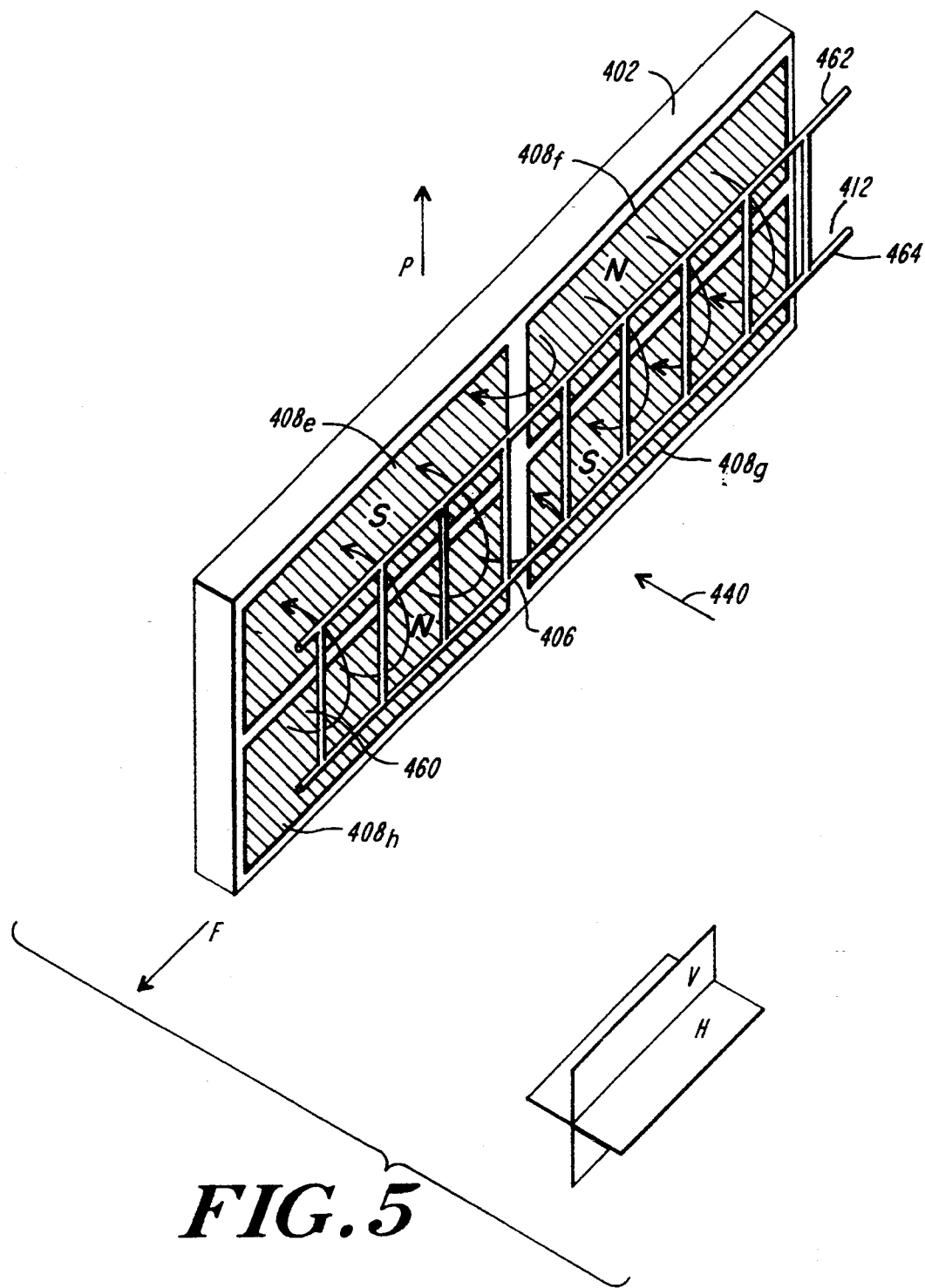
FIG. 5 shows schematically a set of four vehicle magnets and a section of guideway conductor ladder.

As shown in FIG. 5, the members of the 4-pack on the opposite (starboard) side of the guiderail, present opposite polarities to the guiderail. For instance, the magnet $408_e$ presents a S pole to the guiderail opposite that of its analog $408_a$. In this figure, the 4-pack is shown carried by the inside of the vehicle body 402, and the ladder conductor 412, which was not visible in FIG. 4, is shown. It will be understood that this ladder assembly is attached to the right (starboard) side of the guiderail. (However, the guiderail is not shown.)

Due to the alternating upper and lower pole arrangement of the four superconducting coils of the 4-pack, and the linear arrangement of a number of octopoles in sequence, the magnetic flux is drawn tightly around each individual coil. Thus, the magnetic flux from magnet $408_f$ is drawn strongly toward the S pole of magnet $408_g$ and $408_e$. This helps to severely attenuate the excursion of the fields from the superconducting vehicle magnets 408 into the passenger compartment 184 (FIG. 1B), which lies above the vehicle magnets (in the direction as indicated by the arrow P in FIG. 5). A significant contribution to the magnetic fields in the passenger compartment is the end effect arising from a lone magnet or a magnet at the end of a group of magnets along the vehicle length. Thus, if there are fewer ends for the same strength of magnetic field, there will be less end effect for the same strength of field. Thus, increasing the number of magnets adjacent each other along the length of the train reduces the end effect, and thus the field strength in the passenger compartment. The same arrangement also reduces the magnetic field within the parts of the guideway that do not include guideway conductors, e.g. the support structure.

Analysis of Paired Magnet Suspension

A vertical symmetry position for the vehicle relative to the guideway exists, in which no current is induced in the guideway ladder 412. Familiarity with this configuration facilitates understanding the paired magnet configuration of the invention, although, it should be noted, that this is not the equilibrium position at which the vehicle typically travels. If the upper $408_e$ and lower $408_h$ magnet coils of the 4-pack 440 are symmetrically spaced above and below the ladder 412, the magnetic flux field of each magnet coil 408 induces equal and opposite voltages in the loops formed by the rungs and rails of the ladder.

Figure 6A:
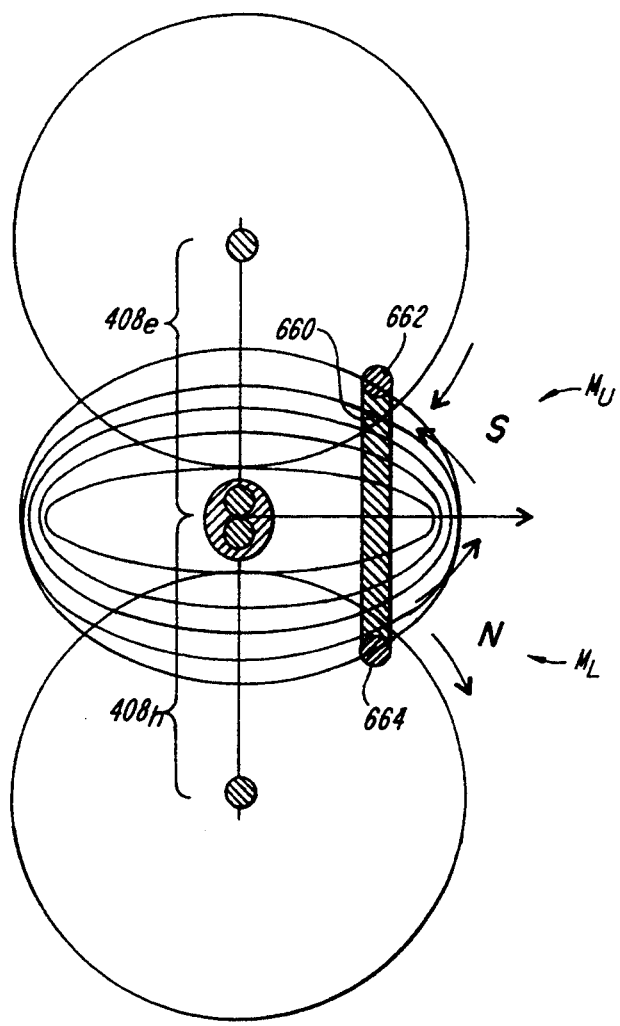
FIG. 6A shows schematically in cross-section the conductors of a pair of vehicle magnets and the rails of a ladder conductor of the guideway, with an indication of the magnetic fields generated by the vehicle conductors.

This can be visualized with reference to FIG. 6A, which shows schematically the magnetic flux lines generated by the upper and lower magnetic coils $408_e$ and $408_h$, respectively, which present S and N magnetic poles to the ladder 412. A representative ladder rung 660 is shown joining the two rails 662 and 664. As the vehicle carrying the magnetic coils 408 moves forward along the guiderail (out of the page, in the view shown in FIG. 6A) the magnetic fields $M_u$ and $M_L$ move relative to the conductors of the guideway ladder.

Considering first the induced voltage in each rung 660, in the rung above the line of symmetry with respect to the vehicle coils 408 the induced voltage tends to create a current in one direction along the rung, while the induced voltage below the axis of symmetry tends to produce a current in the opposite direction to an equal degree. Thus, no current arises, because the induced voltages cancel each other. The rails complete the circuit.

Thus, no net current results in the guideway ladder 412 if the vertical position of the two magnets $408_e$ and $408_h$ remains symmetrically located above and below the ladder 412. If there is no current in the guideway, there is no magnetic field induced to interact with the magnetic field generated by the vehicle magnets $408_e$ and $408_h$, and thus, there is no magnetic shear force to suspend the vehicle against the force of gravity.

If, however, the vehicle is below or above the symmetry position relative to the guideway, one of the vertically stacked magnets of each vertical pair of the magnets 408 would be more tightly coupled to the ladder 412 than the other magnet in the same vertical pair. For instance, if the vehicle were to rest below the symmetry position, the upper magnet $408_e$ would be more tightly coupled to the ladder than would be the lower magnet $408_h$. This would induce a net unbalanced voltage in ladder 412, thereby producing a circulating current within-the ladder 412. The circulating current in the ladder 412 would interact with the magnetic field due to the vehicle coils $408_e$ and $408_h$ and provide a resisting force tending to push the vehicle body 202 toward the vertical symmetry position.

Thus, if the vehicle 202 is at the symmetry position as it travels along in direction F, (which is typically not the case), no current circulates in the ladder 210. However, if the vehicle is below the symmetry position, the currents in the vehicle magnets would remain, and a current would be induced in the ladder 412, would interact with the magnetic field generated by the vehicle magnet coils 408 to tend to push the vehicle upward.

Similarly, if the vehicle were to be jolted upward, the current induced in the ladder would oppose the relative motion, thereby minimizing the tendency for the vehicle to bounce very far upward and bringing the vehicle back to the equilibrium position.

The mutual inductance between the guideway ladder 412 and the vehicle magnets 408 rises very rapidly with displacement from equilibrium. This rapid increase contributes to high efficiency. The configuration of the invention is energy efficient because a high field (or current) can be used in the vehicle and a weak field (or current) can be used in the guideway. This relationship has been found to lead to high efficiency. The efficiency is proportional to the ratio of the vehicle current to the guideway current.

Figure 6B:
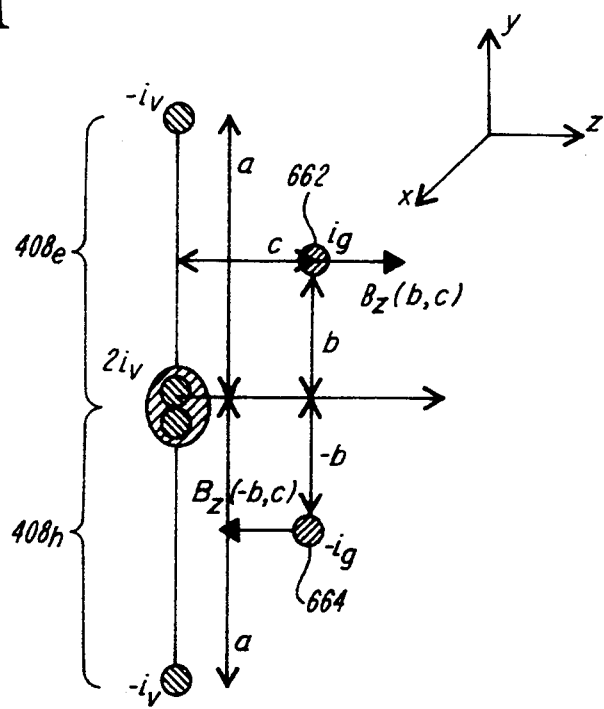
FIG. 6B shows schematically in cross-section the conductors of the vehicle magnets and ladder shown in FIG. 6A, with selected dimensions indicated.

A simple, but effective, two dimensional model useful for analysis of the suspension apparatus is shown in FIG. 6B. The x-axis is aligned with the direction of vehicle motion; the y axis is aligned vertically upward relative to the guideway; the z-axis is aligned horizontally transverse of the guideway and perpendicular to the direction of motion. The guideway is nominally parallel to the ground surface, and thus, nominally vertical and transverse axes can be defined relative to the guideway. The transverse axis is perpendicular to the direction of travel, generally from one side of the guideway to the other. The vertical axis is also perpendicular to the direction of travel and to the transverse axis.

However, there are some instances where the guideway is tilted relative to the ground, for instance when going around a curve. Thus, the guideway "vertical" axis is not parallel to a vertical direction as defined by gravity. In such instance, the vehicle magnets and guideway magnets are also tilted to maintain their alignment with the guideway, rather than the ground. Therefore, as used in this specification and the claims, unless otherwise specified, "vertical" relative to the guideway means the axis of the guideway that is closest to the vertical with respect to gravity, and "horizontal" means a plane that is perpendicular to the guideway vertical dimension.

The vehicle magnet coils are modeled by four filamentary conductors that are long in the x direction, and with a current $+i_\nu$ in the center conductors and $-i_\nu$ in the upper and lower conductors. It is convenient to model the two center conductors as a single conductor with a current $+2i_\nu$. The guideway ladder conductor is modeled by two long filamentary conductors with current $i_g$ in the upper conductor and $-i_g$ in the lower conductor. The dimensions are as shown in FIG. 6B.

Straightforward application of Maxwell's equations allows calculation of the z component (horizontal) of the magnetic field B at the locations of the rails of the ladder conductor 412 arising from a pair of upper and lower vehicle magnets $408_e$ and $408_h$. This is the component of the magnetic field that gives rise to an induced current in the guideway conductor. This induced current causes the induced guideway magnetic field which, in combination with the vehicle magnetic field, suspends the vehicle. The field, at location y=b; z=c (the upper ladder rail) is given by:

$$B_z = \frac{\mu_0 i_\nu}{2\pi} \left( \frac{2b}{b^2 + c^2} + \frac{a-b}{(a-b)^2 + c^2} - \frac{a+b}{(a+b)^2 + c^2} \right), \quad (1)$$

where $\mu_0$ is the permeability in free space and $i_\nu$ is the current in the vehicle coils.

The designer can select the vehicle current $i_\nu$ and the three dimension a, b, and c to achieve the highest possible $B_z$. The vehicle current is determined by a variety of factors, and for a reasonable baseline design set forth below, it is set at 400 kA-turns. This is a compromise between countervailing objectives of a high field at the guideway but low vehicle magnet weight and low fields in the vehicle.

If the vehicle position is spaced away slightly vertically from the symmetry position, the currents $+i_g$ and $-i_g$ induced in the guideway conductors by virtue of the away from symmetry position of the vehicle, as discussed above, will be large. It can be assumed that the spacing of the vehicle from the symmetry position is so slight that there is no perceptible change in $B_z$.

Optimizing Dimensions

It is desirable for c to be as small as possible, but this dimension is constrained by mechanical clearance, cryogenic insulation thickness, and suspension ladder conductor size. Therefore a and b must be chosen to maximize $B_z$ for a specific constrained choice of c. This optimization can be done analytically leading to:

$$a = 2b \qquad (2)$$

$$9b^4 - 10b^2c^2 - 3c^4 = 0; \text{ or}$$

$$\frac{b}{c} = \sqrt{\frac{5 + \sqrt{52}}{9}} = 1.1648$$

$$B_z = 1.2182 \frac{\mu_0 i_v}{2\pi c}$$

Figure 7:
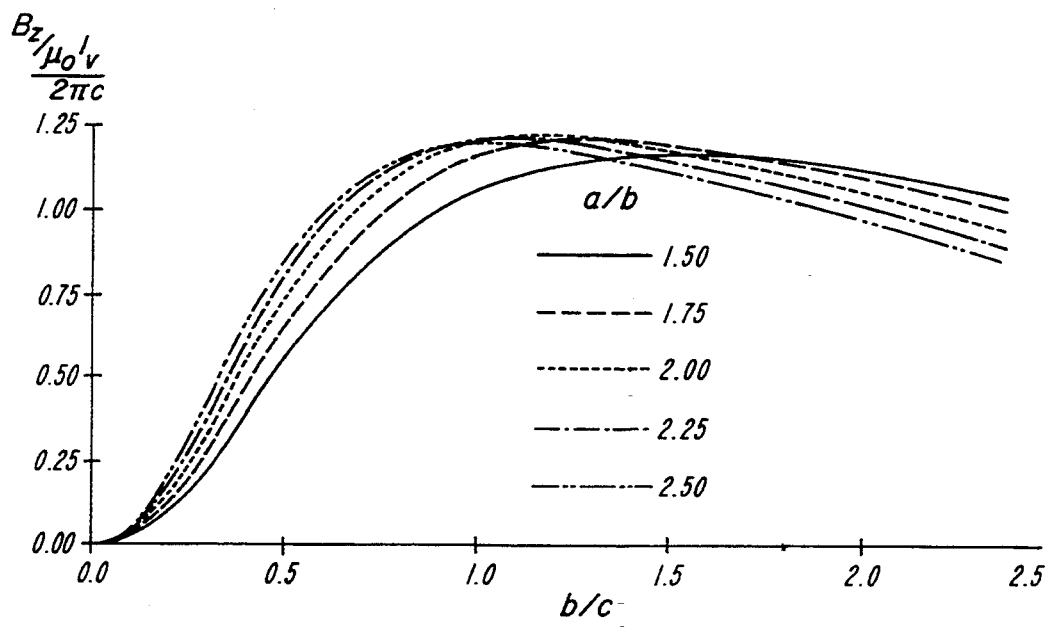
FIG. 7 shows graphically the relation between a magnetic field at the ladder conductors and a ratio of selected dimensions.

Although the foregoing sets forth optimum values of a and b relative to c, there is relatively little variation over a wide range of parameters, as indicated by FIG. 7. FIG. 7 shows the relationship between the ratio of $$\frac{b_z}{\frac{\mu_0 i_v}{2\pi}}$$

and the ratio a/b.

For a baseline design with $i_v$=400 kA-turns and c=0.14 m, this leads to optimum a and b and the resulting $B_z$ given by:

$$i_v = 400,000 A \qquad (3)$$

$$c = 0.14 m$$

$$0.5a = b = 1.1648c = 0.1648 m$$

$$B_z = 1.2181 \frac{\mu_0 i_v}{2\pi c} = 0.6961 \text{ Tesla}$$

A reasonable baseline design uses 0.5a=b=0.175 m; the difference from the optimum value is negligible and the somewhat larger a and b are desirable for a suitable propulsion system.

Dependence of Field on Gap

An important relationship is the dependence of the pertinent magnetic field, $B_z$, on b (the ladder spread) and c (the spacing between vehicle magnet and guiderail) in the vicinity of the design values b=$b_0$ and c=$c_0$. If the optimum values of a and b are used, then this relationship is:

$$\left(\frac{\partial B_z}{\partial b}\right)_{a,b \text{ opt}} = 0 \qquad (4)$$

$$\left(\frac{\partial B_z}{\partial c}\right)_{a,b \text{ opt}} = -\frac{B_z}{c}$$

Figure 8:
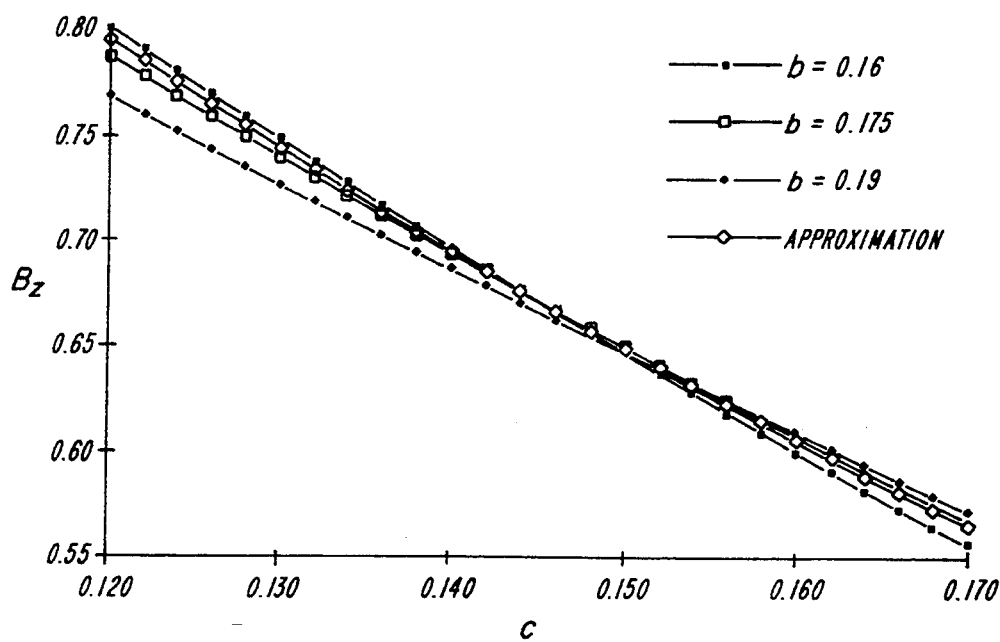
FIG. 8 shows graphically the relation between a magnetic field at the ladder and selected other dimensions.

FIG. 8 shows $B_z$ for values of a, b, and c near those used in the example of Equations 3. FIG. 8 shows that $B_z$ depends strongly on c but only weakly on b with the assumption that a=2b. An excellent approximation of the c dependence as shown in FIG. 8 is given by:

$$B_z(c) = B_z(c_0) \frac{2c_0^2}{c_0^2 + c^2}; \qquad (5)$$

$$c_0 = 0.14 m;$$

-continued $$B_z(c_0) = 0.6940 T$$

Superconducting Magnets

Figure 2:
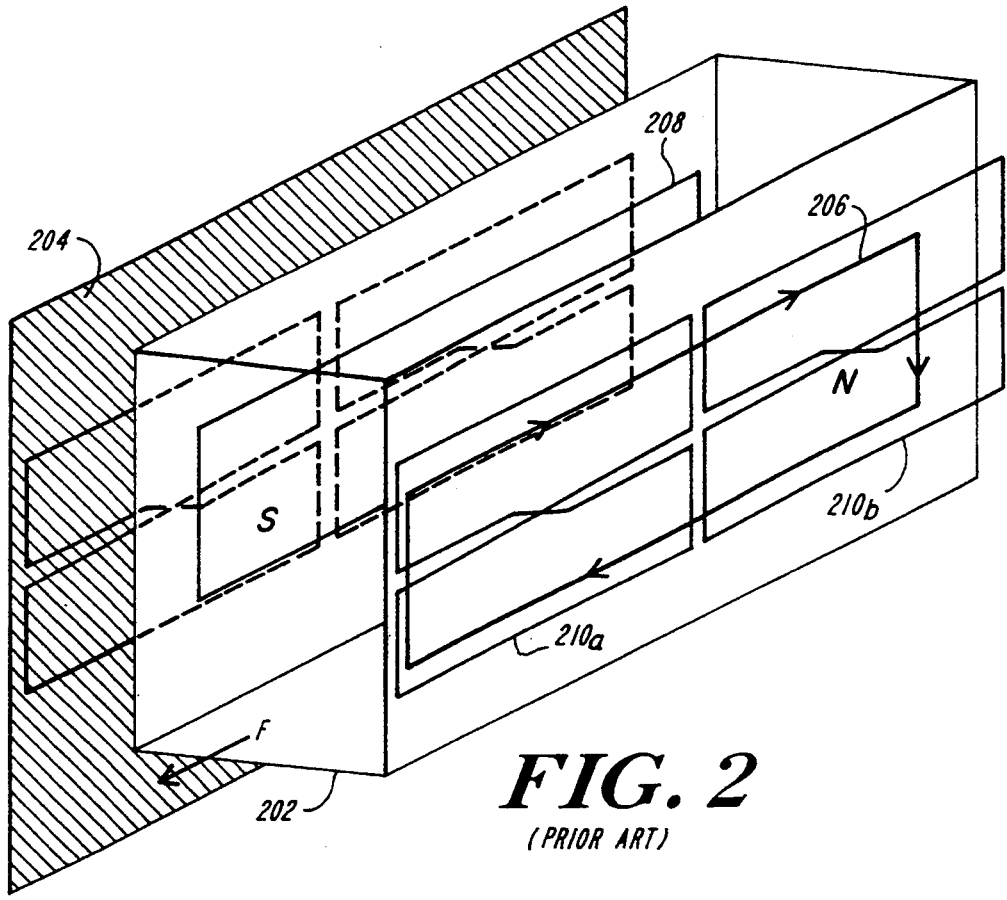
FIG. 2 shows schematically a prior art EDS suspension apparatus, showing a portion of a vehicle and guideway.
Figure 3A:
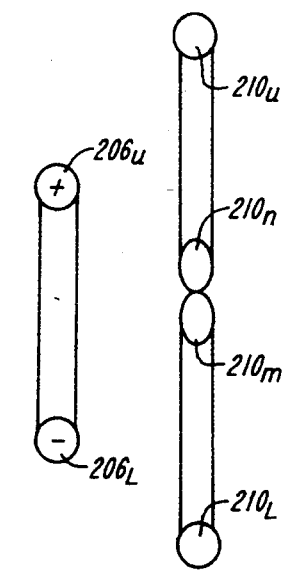
FIG. 3A shows schematically in cross-section, a prior art vehicle magnet coil and figure-eight guideway loop in a symmetric position.
Figure 3B:
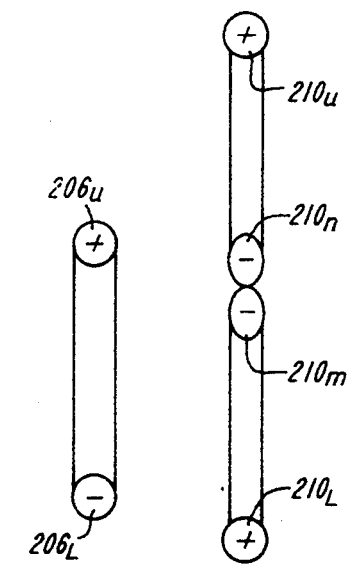
FIG. 3B shows schematically in cross-section, the prior art vehicle magnet coil and figure-eight guideway loop of FIG. 3A in a non-symmetric position.
Figure 9:
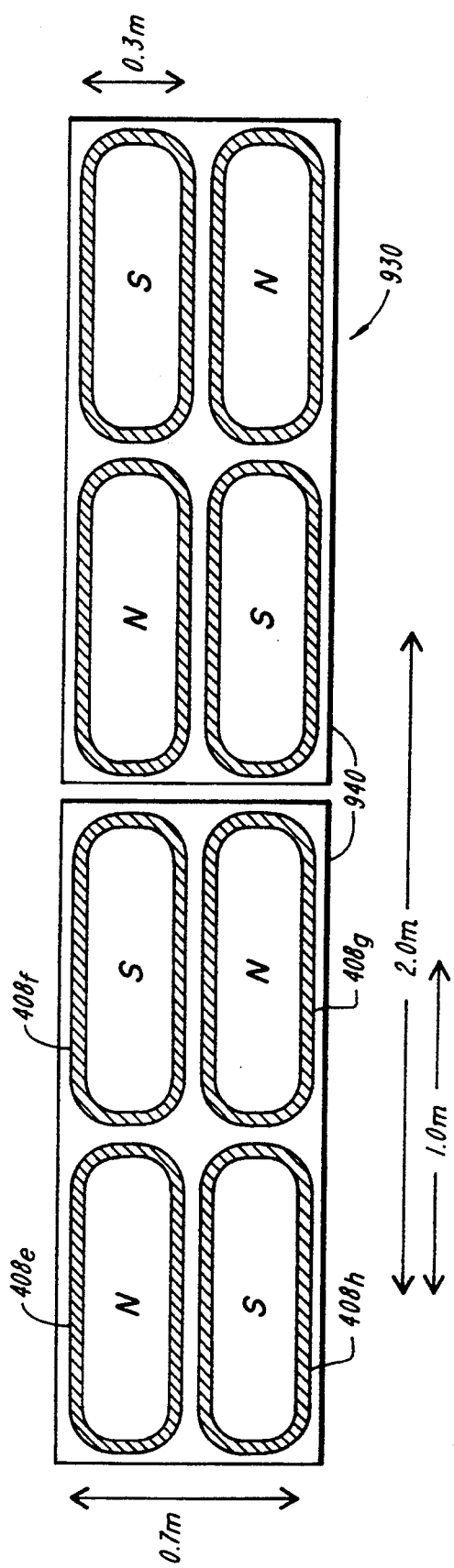
FIG. 9 shows schematically in elevation a group of eight vehicle magnets.
Figure 10:
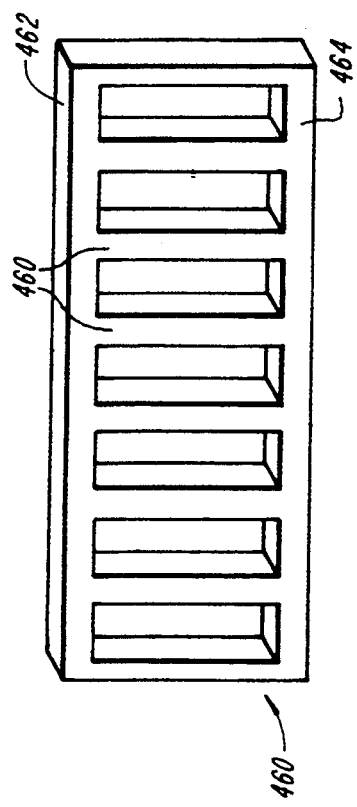
FIG. 10 shows schematically a section of ladder conductor of the guideway.

As has been discussed above in connection with FIGS. 2, 4 and 5, the basic vehicle magnet module is an "octopole" or "4-pack" of four coils as shown in FIG. 9. Arrays of these modules provide the EDS suspension described above. Ideally, many of these modules would be placed next to each other under the whole length of each car of the vehicle (with magnetic poles pointing transverse of the vehicle, i.e. perpendicular to the vehicle travel path and nominally horizontal, relative to the ground) to create a distributed load with a large number of magnetic poles for the LSM, described below. (This configuration of many magnets adjacent each other along the length of the vehicle also minimizes the excursion of the field into the passenger compartment as explained above.) However, a superconducting magnet is relatively heavy and expensive because of the housing, force containment, vacuum insulation, cooling system, etc. Therefore, it is not practical to line the entire length of the vehicle with superconducting magnets.

If the only problem were to create a set of magnets with a specified total energy storage, a small number of relatively powerful magnets could be used. However, this would lead to a concentrated load on the guideway and a more expensive linear motor.

A reasonable compromise is to reduce the size and weight of each magnet as much as possible, and use magnets under approximately 70% of the vehicle length. This gives most of the advantages that would accrue to a fully distributed load, but saves considerable unsprung weight on the vehicle.

Several 4-pack modules are physically integrated to form a vehicle bogie, and then several bogies are used to provide the primary vehicle suspension. In a baseline design, as shown in FIG. 1B, each bogie 130 uses two 4-pack modules on each side, for a total of sixteen 4-packs per bogie. One side of a representative bogie 930 is also shown in FIG. 9, made up of two 4-packs 940. There may be 6 bogies 130 along the length of the entire vehicle. Thus, there are 24 modules used to support the vehicle. For a fully loaded vehicle, with a mass of, for instance, 63.4 tons, the weight is distributed almost uniformly on all magnet modules, so each module supports 63.4/24=2.64 tons, or 1.32 tons per meter of two meter long module.

As shown in FIG. 9, for a baseline design the individual coils 408 are spaced on 1 meter centers, so the pole pitch of the magnetic field is 1 meter and the wavelength, $\Lambda$, or distance between magnets of like polarity (within either the upper or lower rank of magnets), is 2 meters. Magnets of like polarity are found, one in each of two adjacent 4-packs 940. Since the fundamental frequency of guideway conductor winding current for the linear synchronous motor is $u_x/\Lambda$, (where $u_x$ is the speed of the vehicle forward) a speed range of 50 to 150 m/s (112–336 mph) implies an electrical frequency of 25 to 75 Hz.

Theoretical efficiency calculations show that on the order of 50 cm² of suspension area is needed, but for frequencies of 25 to 75 Hz it is difficult to create uniform current density over the entire area in a continuous sheet. This is due to the skin effect discussed earlier. Thus either discrete coils constructed from many strands of fine wire, or laminated conductors with the flux direction parallel to the laminations are used.

Ladder Construction

Figure 19:
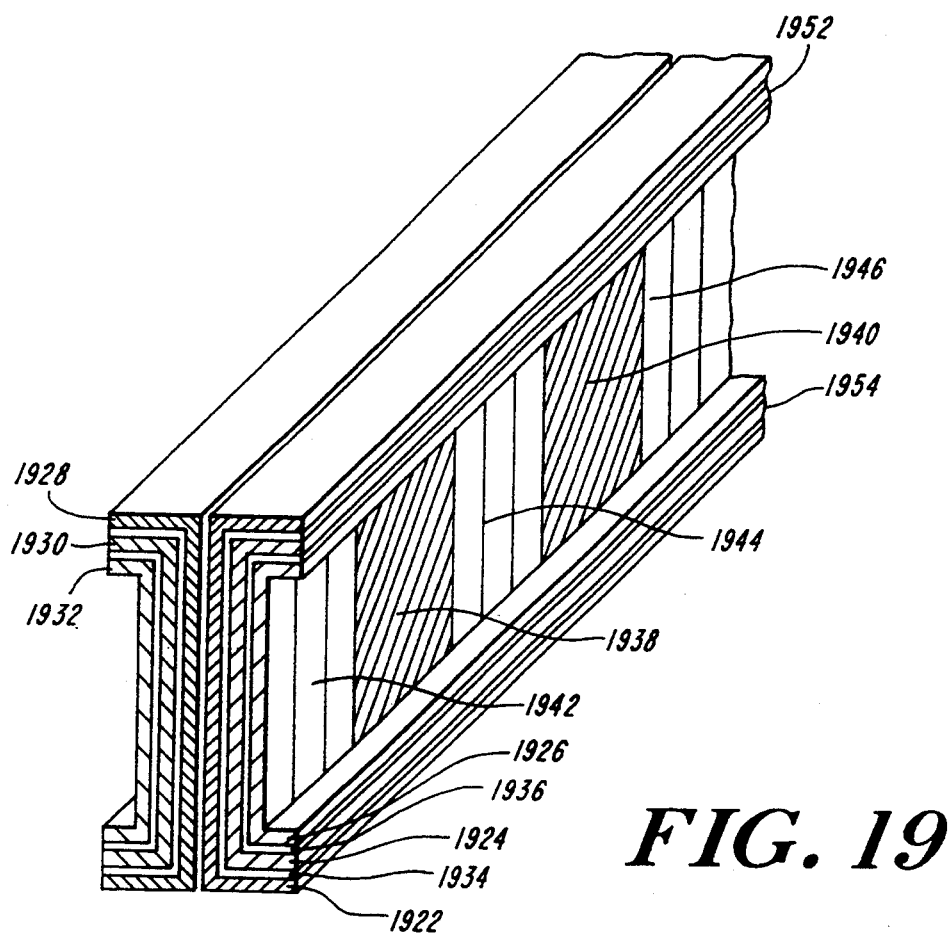
FIG. 19 shows schematically in cross section a ladder conductor of the invention, showing its laminated construction.

FIG. 19 is an end perspective view of the ladder guideway conductor of the invention. A basic ladder configuration can be made from a plurality, e.g., six, of nested channels, 1922, 1924, 1926, 1928, 1930, 1932, of graduated sizes. Each nested channel is insulated on both surfaces, so that no current can flow from one channel to the adjacent channel. For instance, the insulation layer 1936 between the outermost channel 1926 and the middle channel 1924, prevent current from flowing between the middle channel 1924 and the outer channel 1926. This prevents the type of eddy currents that have made use of ladders inefficient in the past.

Figure 20:
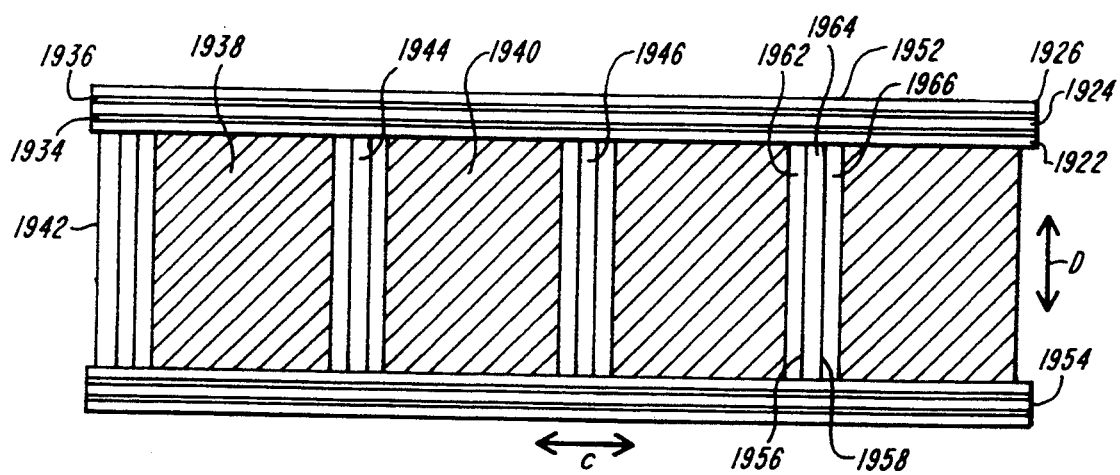
FIG. 20 shows schematically a side view of the ladder of FIG. 19.

The ladder is formed by first creating continuous channels. Either before or after nesting and joining the channels, together, large sections 1938, 1940 are removed along its length, to leave the rungs 1942, 1944, 1946 and upper and lower rails 1952, 1954 remaining. This is also shown schematically in FIG. 20. The remaining sections 1942, 1944, 1946 are the rungs. It is important to constrain current to only travel along the length of the rungs (i.e. from one rail 1952 to the other 1954), rather than across their width or through their thickness. The laminations 1934, 1936 discussed above prevents current from flowing through the rungs' thickness. To prevent current from flowing across the width of the rungs, slits 1956, 1958 are made, piercing each rung in several places, along the rungs' entire length, all the way through from one surface to the other. The resulting structure is equivalent to having three separate rungs 1962, 1964, 1966, albeit very closely spaced. Thus, current can only flow in the rails parallel to arrow C and in the rungs parallel to arrow D.

As a result of the stacked magnet design, only relatively low current densities are required in the guideway conductors and a design trade-off can be made between using more aluminum on the guideway or tolerating higher power loss.

Figure 22:
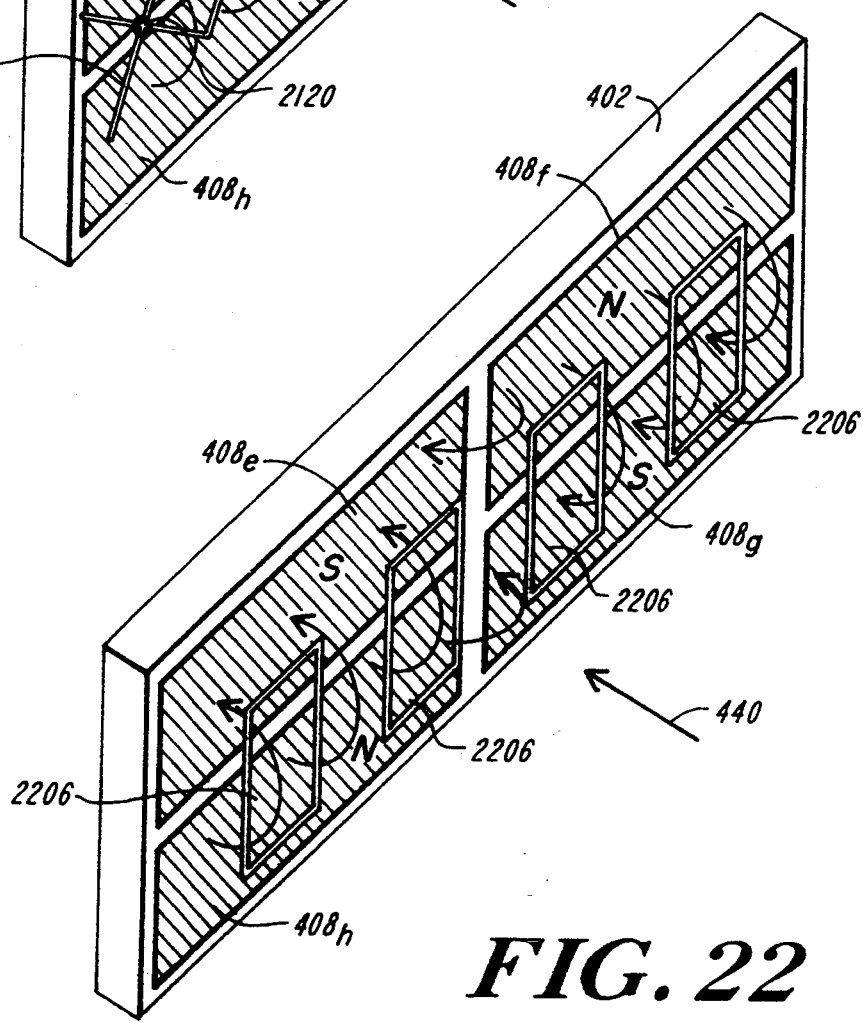
FIG. 22 shows schematically an embodiment of the suspension apparatus of the invention in a suspension configuration using discrete conductive coils.

The stacked paired magnet suspension system could also use discrete coils as shown in FIG. 22, but the most effective use of material is achieved with a ladder as shown in FIG. 5.

Representative Vehicle Parameters

It is helpful to consider a representative or "baseline" vehicle for sizing the components of an implementation of the present invention. However, the invention design concept allows many sizes and types of vehicles to operate simultaneously. Typical ranges of feasible vehicle parameters are given in Table 1. Smaller vehicles can operate mixed with the baseline vehicles.

TABLE 1

| Parameter | Vehicle and guideway attributes. | | | |
|---|---|---|---|---|
| | units | min | max | baseline |
| Vehicle size: | | | | |
| length | m | 28 | 50 | 36 |
| width | m | 3.2 | 4.1 | 4.1 |
| height | m | 4.0 | 5.0 | 4.88 |
| capacity | seats | 80 | 160 | 120 |
| Vehicle mass: | | | | |
| empty | tons | 32 | 60 | 50 |
| loaded | tons | 50 | 80 | 64 |
| Bogies: | | | | |
| number | | 4 | 8 | 6 |
| tot. length | m | 18 | 32 | 24 |

TABLE 1-continued

| Parameter | Vehicle and guideway attributes. | | | |
|---|---|---|---|---|
| | units | min | max | baseline |
| Aerodyn. drag @ 135 m/s | kN | 30 | 50 | 39 |
| Girder: | | | | |
| width | m | 1.2 | 1.2 | 1.2 |
| height | m | 1.8 | 1.8 | 1.8 |
| horiz. gap | m | 0.05 | 0.05 | 0.05 |
| vert. gap | m | 0.10 | 0.10 | 0.10 |

With a transportation capability of 4,000 to 12,000 passengers per hour, the dominant user cost is amortization of the capital cost of the guideway. It is reasonable to design the lowest cost guideway that has sufficient strength and durability. A box beam girder system satisfies this need, and has the following features: low capital cost for required strength and rigidity; low aerodynamic drag for vehicles following the guideway; attractive appearance; potential for automated construction; capacity to tolerate a range of vehicle sizes and types; partial non magnetic reinforcing to reduce extraneous losses or forces

Paired Magnet Guidance Using Figure-Eight Guideway Conductors

As has been mentioned, another aspect of a Maglev vehicle system is the apparatus that keeps the vehicle centered with respect to the transverse or side-to-side dimension of the guideway. It is important that the suspension system be compatible with the guidance system, and vice-versa. The guidance system described immediately following is believed to work well with the suspension configuration of the invention. The person of ordinary skill in the art will recognize that other guidance systems are also compatible with the invention, and that the guidance system described is exemplary only, and not intended to be limiting in any sense.

(The guidance system discussed below is not directly analogous to the suspension configuration of the invention discussed above. It is, however, an aspect of the invention, and it works well with the suspension configuration described above, using the same vehicle magnets. Another guidance system is discussed further below, which is more directly analogous to the suspension configuration of the invention. It uses paired magnets and a ladder guideway conductor. However, the magnets must be oriented differently than they are for suspension, and therefore, that guidance apparatus can not be used with the suspension magnets.)

The suspension system of the invention provides some guidance, but in the representative baseline design, the guidance force it provides is only about 0.1 times the suspension force. Approximately five to ten times this amount is required for adequate guidance. It would be possible to design a paired magnet suspension system that produced greater guidance force. However, there is a disadvantage of making the guidance force proportional to suspension force. In the interest of increasing efficiency and minimizing interaction between suspension and guidance it is beneficial to use a separate guidance system.

Since the design of the guidance system is subject to the same laws that govern the suspension system, a paired magnet scheme with many of the attributes of the suspension system can be used. Cross coupling is used between guideway guidance loops on opposite sides of the guideway so that when the vehicle is centered there is no force and no power loss. The guidance is almost totally decoupled from the suspension.

Figure 11:
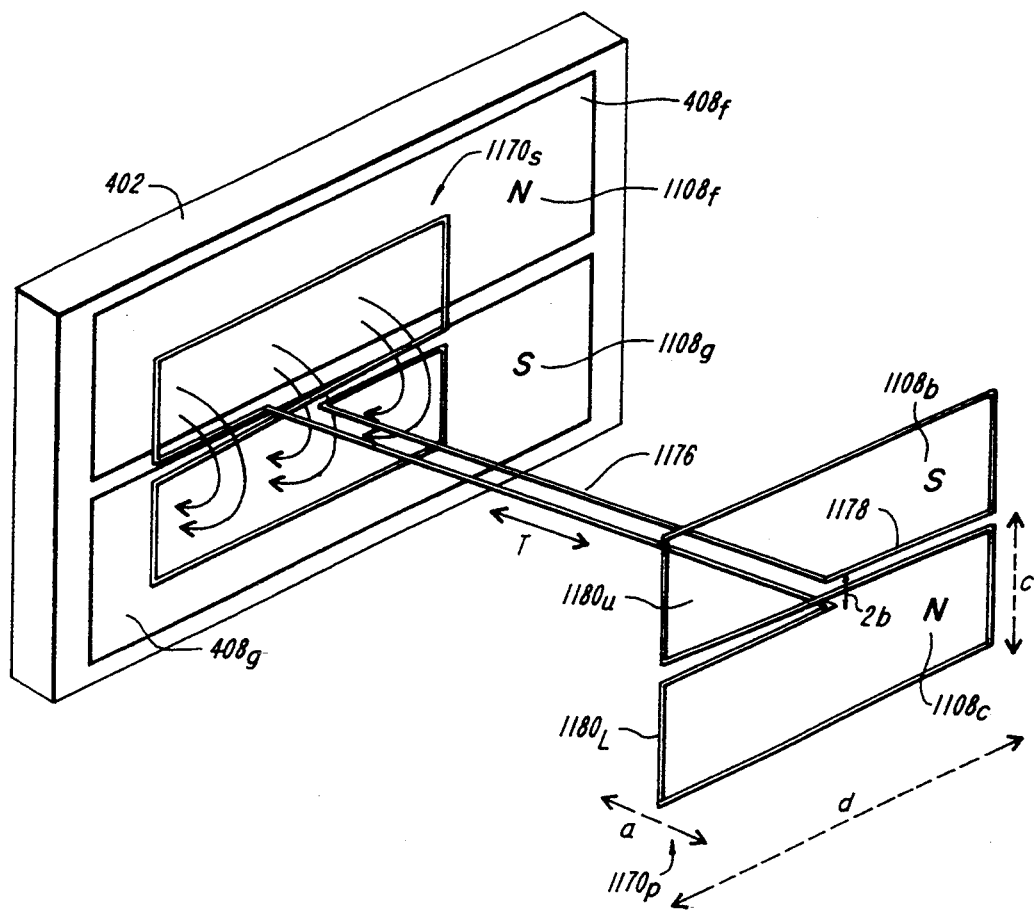
FIG. 11 shows schematically an embodiment of the guidance apparatus of the invention using a pair of vehicle magnet coils and a pair of linked figure-eight guidance loops.

With reference to FIG. 11, a pair of stacked vehicle magnets $408_f$ and $408_g$ (the same as the vehicle magnets discussed above in connection with FIGS. 4, 5 and 6) interact with a connected pair of starboard and port figure-eight loops $1170_s$ and $1170_p$ mounted to the starboard and port sides of the guiderail (not shown) respectively. The vehicle magnets $408_f$ and $408_g$ are an upper and lower pair of the four magnets that make up a four-pack, as discussed above. The guiderail, mounting hardware, and other apparatus, fills essentially the entire space between the starboard and port figure-eight loops $1170_s$ and $1170_p$, although, none are shown, for clarity.

Figure 18:
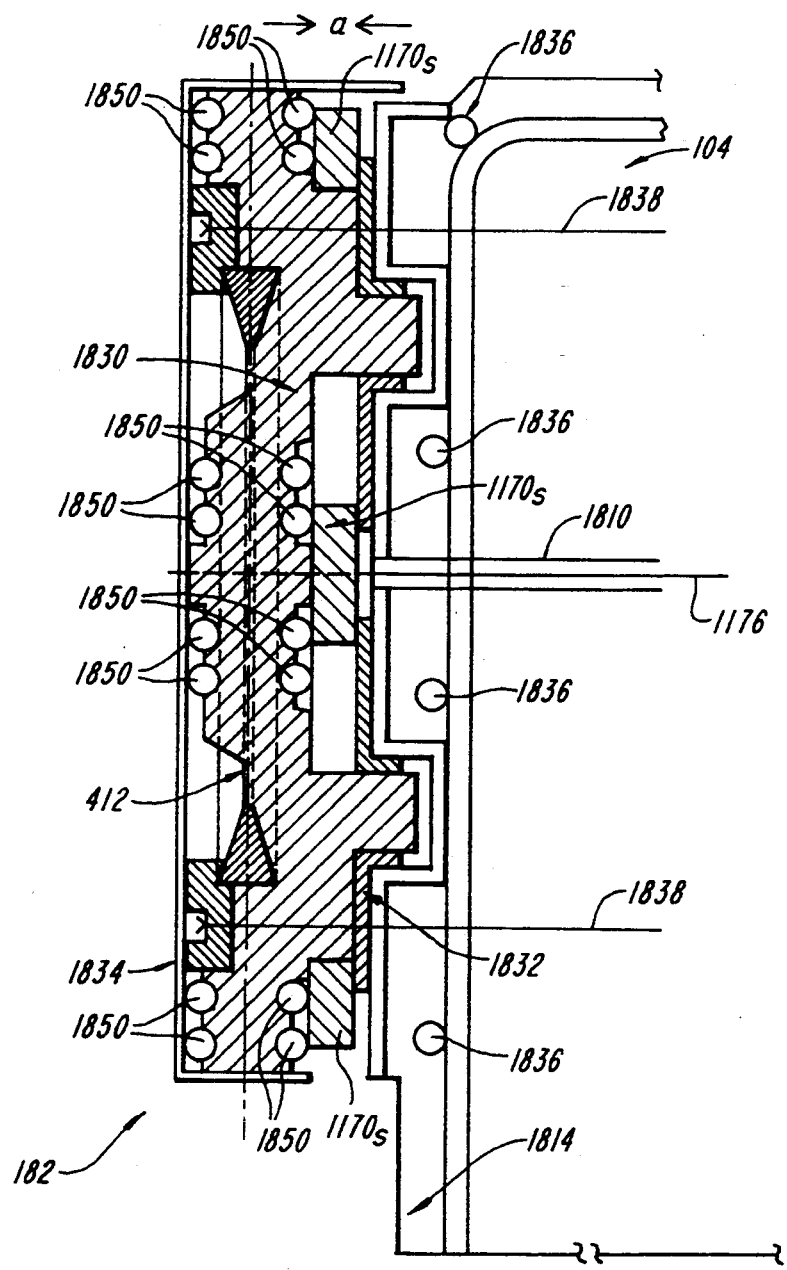
FIG. 18 shows schematically in cross-section one half of the upper portion of a guiderail and the various guiderail conductors.

Several different sets of guideway conductors are used in connection with the present invention. Making up the first set includes the conductors that make up the guideway suspension ladders 406 and 412 on the port and starboard sides of the guideway. The guideway ladders are fixed to the guideway rail. Making up the second set are a series of paired figure-eights, introduced with reference to FIG. 11. Many of these paired figure-eights ("figure-eighty-eights") extend along the guideway. The loops that make up the figure-eighty-eights are at a different depth across the width of the guiderail, as shown in FIG. 18, discussed below, typically deeper than the ladder. A third set of guideway conductors will be discussed below in connection with a suitable propulsion system for use with the invention. The propulsion conductors are generally continuous, more like the ladder than the discrete figure-eighty-eights, and are also at a different depth from the other two sets of conductors.

Returning to the guidance apparatus, the magnetic fields generated by the upper and lower vehicle magnets $408_f$ and $408_g$ and presented to the starboard figure-eight $1170_s$ are N $1108_f$ and S $1108_g$, respectively. Conversely, the magnetic fields, generated by the upper and lower vehicle magnets $408_b$ and $408_c$ (not shown) and presented to the port figure-eight $1170_p$ are S $1108_b$ and N $1108_c$, respectively.

When the vehicle is centered horizontally (transverse of the guideway), the voltages induced by the upper and lower pair of vehicle magnets 408 in the opposite-side loops $1170_s$ and $1170_p$ cancel, so there is no current flow in the figure-eighty-eight and no lateral force along the directions indicated by the double-headed arrow T. If the vehicle shifts to one side of the guideway, then the induced voltages in the opposite side guideway guidance loops do not cancel and the resulting current produces a magnetic field that interacts with the magnetic fields generated by the vehicle magnets 408 to push on one side of the vehicle and pull on the other side. Within limits the guideway figure-eight coils can be designed to achieve any desired lateral stiffness, and the stiffness is almost independent of the relative vertical position between the vehicle and the guideway. The cross coupling between the port and starboard guideway loops $1170_p$ and $1170_s$ achieves high efficiency because there is only current flow when a restoring force is needed.

An important feature of the guidance design is the relative independence of guidance and suspension forces, so that the vehicle can be guided even if the vehicle is in the zero force position on the suspension ladder conductor, as it may be at low speed when an alternate suspension system is used.

Figure 12:
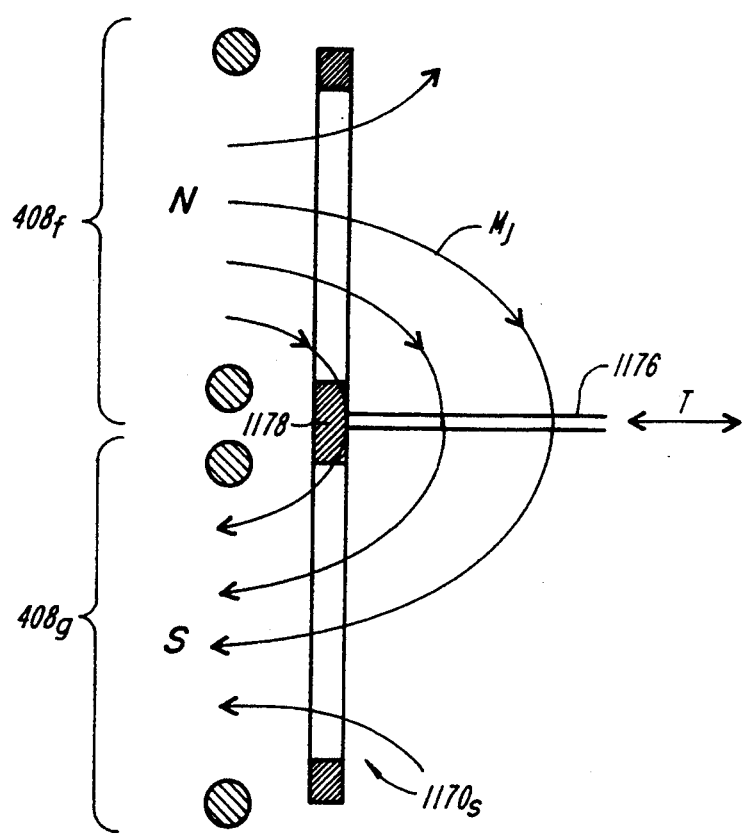
FIG. 12 shows schematically in cross section the vehicle magnet coils shown in FIG. 11 and one figure-eight loop of a pair of linked figure-eight guidance loops.

The operation of the guidance system will also be understood in terms of the flux pattern shown in FIG. 12. The magnetic flux linking the upper and lower vehicle coils $408_f$ and $408_g$ adds and produces a large voltage in the adjacent figure-eight loop $1170_s$ when the vehicle is moving. On the other side of the vehicle, the magnets $408_b$ and $408_c$ produce an equal and opposite voltage in adjacent figure-eight loop $1170_p$. If the vehicle is centered, the voltages cancel, and no current flows. If there is lateral offset, the voltage on one side will exceed that on the other, so that current flows through the pair of figure-eight loops $1170_s$ and $1170_p$. The current in the middle legs 1178 of the figure-eight guidance loops $1170_s$ and $1170_p$ interacts with the vertical flux lines $M_J$ to produce a guidance force transverse of the guiderail, along the directions T, as the case may be.

Figure 13:
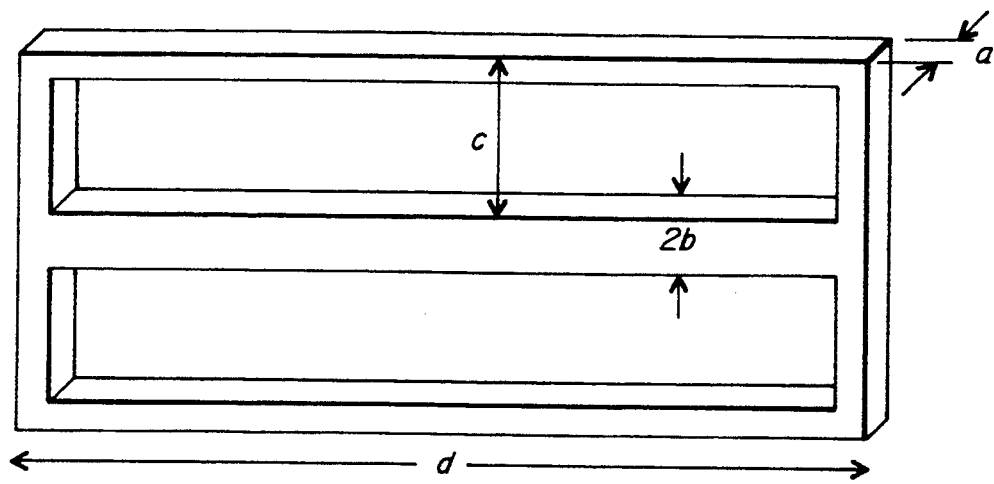
FIG. 13 shows schematically a configuration of one figure eight of a pair of figure-eight loops for use in a guidance apparatus of the invention.

The shape of the guideway guidance figure-eight loops 1170 is shown in FIG. 13. The dimension a is the thickness of the loops that make up one of either a starboard or port figure-eight loop 1170. This dimension is also shown in FIG. 18. The length d is the dimension of the figure-eight loops 1170 in the direction of travel. The dimension c is the height of each lobe of a single figure-eight loop 1170, and the dimension $2b$ is the distance between the bottom of an upper lobe $1180_U$ and the top of a lower lobe $1180_L$. Several of these dimensions are also indicated in FIG. 11, to help orient the two figures.

Guidance loops 1170 are located continuously along both sides of the guideway with a spacing of one loop every 0.667 meters. The winding may consist of two conventional coils to make a single figure-eight connected together to create the effect of a Figure-of-8 coil. The loops are bonded in fiberglass to provide mechanical strength. Approximately 50% of the cross section area is aluminum with the rest being insulation and fiberglass. The winding cannot have too many turns or the induced voltage will be excessive, and should not have too few turns so that the cross connection is a problem. A reasonable baseline design calls uses 30 turns of Litz wire made with 19 strands of #16 aluminum wire.

Paired Magnet Propulsion System

As has been mentioned, a third aspect of a Maglev vehicle is the propulsion system. For any EDS suspension system with an air gap of 2 cm or more, a reasonable choice for propulsion is an active guideway Linear Synchronous Motor "LSM".

A suitable propulsion design for use with the suspension system of the invention uses a single set of vehicle magnets for suspension, guidance, and propulsion. This leads to an efficient design, but it also means there is a compromise between the vehicle magnet design among these three purposes.

In order to accomplish propulsion, currents are applied to the third set of conductors in the guideway mentioned above, known as the propulsion windings or meanders. The currents in the propulsion winding are actively controlled to make the vehicle move at the same speed as the traveling field resulting from the currents, and hence the term synchronous motor.

A synchronous motor system includes: windings 1410 (FIG. 14) in the guideway (not shown), which produce the traveling magnetic field; a wayside power distribution system that connects an electronic power controller to the guideway motor windings 1410 in a block of guideway in which a vehicle is located; a power transmission system that accepts utility generated power and distributes it to electronic power converters located at regular intervals along the guideway; electronic power conversion equipment that converts fixed voltage and frequency utility power into variable voltage and variable frequency power that is applied to the guideway windings 1410; and a control system that provides the correct current waveforms according to vehicle force and speed requirements, and also provides various protection and failure monitoring facilities.

An LSM system suitable for use with the suspension apparatus of the invention is described in detail in Thornton, R. D., Perreault, D., Clark, T, "Linear Synchronous Motors for Maglev," a report filed with the U.S. Department of Transportation and Federal Railroad Administration in January of 1993, which is available to the public under number DOT/FRA/NMI-92/13, through the National Technical Information Service, Springfield, Va., 22161, and which is incorporated fully herein by reference (the "DOT/FRA" document).

An important objective for the propulsion design is to ensure that the flux pattern created by the propulsion windings in the guiderail does not have undesirable electromagnetic coupling to the suspension and guidance coils. One way to accomplish this is with a vertically symmetrical double winding scheme illustrated schematically in FIG. 14. The upper $1410_U$ and lower $1410_L$ windings carry the same current in the same direction as each other, so there is no coupling into either the suspension ladders (412 or 406 (not shown)) the paired figure-eight guidance coils 1170. The use of two separate windings $1410_U$ and $1410_L$ for each phase also allows the use of a higher voltage power source.

Figure 14:
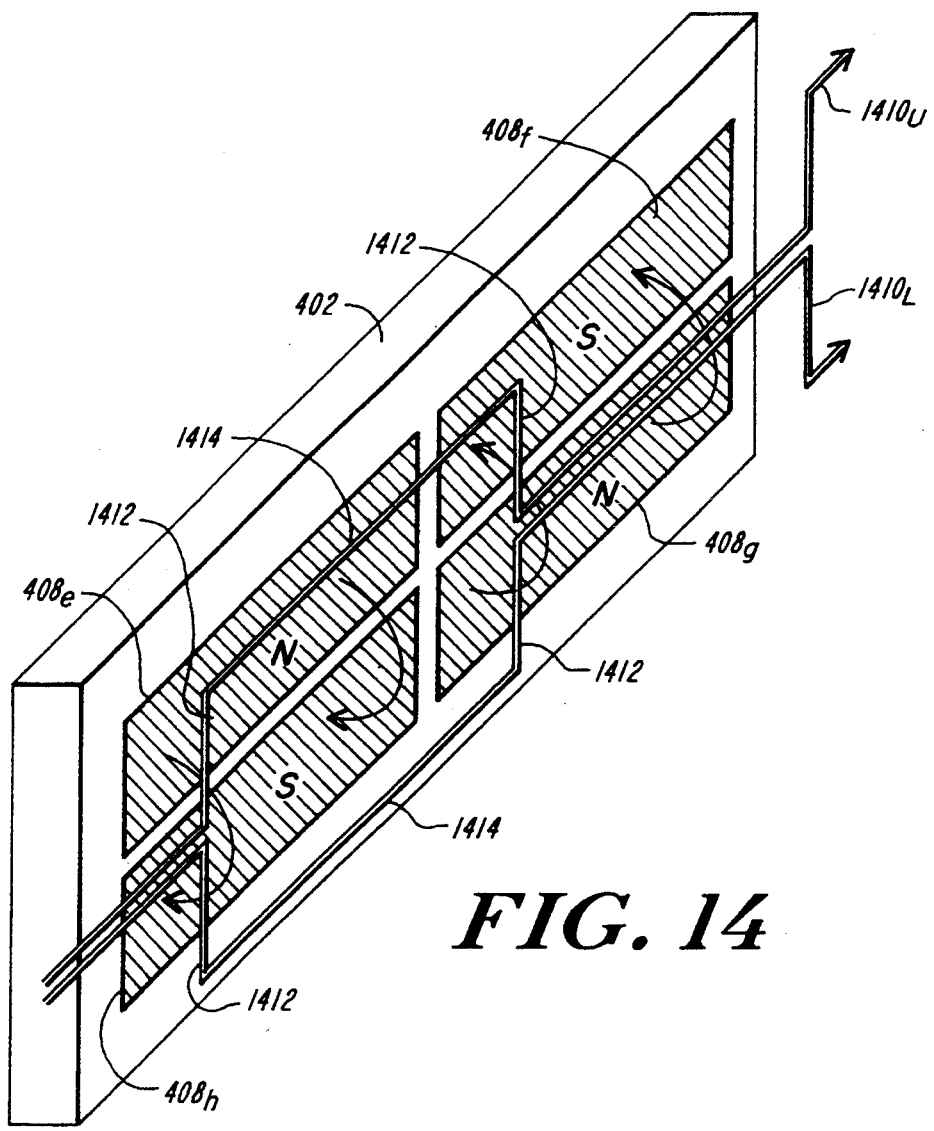
FIG. 14 shows schematically a four-pack of vehicle magnets and a length of linear guideway conductors for use in a linear synchronous motor that may be used along with the suspension apparatus of the invention. One phase of the upper and lower propulsion conductors is shown.

In FIG. 14, horizontal magnetic flux resulting from vehicle magnets 408 interacts with the vertical conductor elements 1412 of the propulsion windings 1410 to produce a thrust in the direction of vehicle travel. There is also a vertical force due to the interaction of the horizontal vehicle flux interacting with the horizontal sections 1414 of the propulsion winding 1410. If the current in the upper and lower guideway propulsion conductors $1410_U$ and $1410_L$ are identical and the vehicle magnets 408 are centered vertically with respect to the upper and lower guideway propulsion conductors, then the vertical forces cancel and there is only a propulsive force in the direction of travel. It is also possible to deliberately change the relative current polarities to produce no net propulsion, but a significant vertical force. This capability allows the guideway propulsion windings 1410 to provide substantial lift at low speeds, an important capability.

Figure 15:
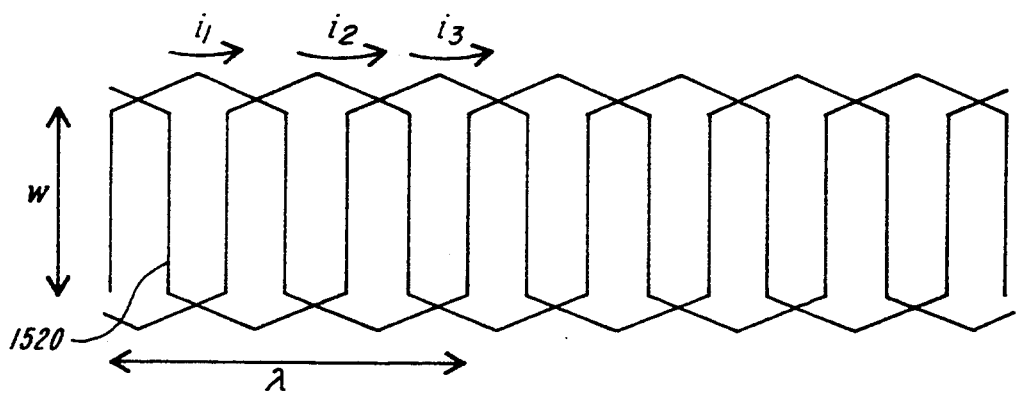
FIG. 15 shows schematically three conductors that may be used as part of a three phase linear synchronous motor, such as shown in part in FIG. 14.

The winding for one phase out of a multi-phase system is shown in FIG. 14 and a simplified drawing for a three phase winding is shown in FIG. 15. Only the upper or lone conductor 1410U of each phase is shown. The wavelength λ is the distance between successive peaks of the same polarity in the magnetic wave. It is also twice the pole pitch, which is the distance between successive alternating magnetic poles of vehicle magnets 408. The winding width w is defined to be an effective width that is somewhat longer than the straight section 1520 to account for the flux linking the end turns; this part of the winding produces the propulsive force. The three phase currents are $i_1$ $i_2$ and $i_3$. The control of these currents is important to control the vehicle, and the power switching is done by an electronic system described in the DOT/FRA document identified above.

The wavelength λ should ideally be an order of magnitude greater than the horizontal gap between the vehicle magnet coils 408 and the guideway conductors 1410, but if the wavelength is too long, the motor efficiency will suffer. Additionally, a long pole pitch would cause electromagnetic fields to extend greater distances from the guideway. For the Maglev system described, because the same magnets are used for suspension, guidance, and propulsion, so it is not possible to optimize the pole pitch for a single function.

The current requirements for the guideway windings 1410 depend on the shape and strength of the field produced by the vehicle magnets 408. The total thrust produced by a single guideway winding $1410_U$ is $F = B \, 1 \, i$, where B is the average magnetic field strength in the plane of the winding, 1 is the total effective length of the winding in a direction perpendicular to the direction of travel, and i is the winding current. For a given vehicle at a specified speed and acceleration, the force requirements and vehicle magnet strength will dictate a required winding current. The speed at each point on the guideway must be set by the system and continually monitored to ensure safe operation of vehicles on close headway.

A suitable arrangement is to have port and starboard motor windings on the guideway, each with six phases of meander windings. The use of six phases allows considerable fault tolerance since a failure of any one phase will allow power in the remaining phases to provide continued operation, however with reduced acceleration and deceleration capacity.

Low Speed Lift

The propulsion system is capable of providing substantial vertical force to lift the vehicle at low speeds when the repulsive induced current suspension apparatus of the invention described above is not very effective. In particular, at speeds below 10 m/s (23 miles per hour) the vehicle would have fallen enough that any lower speed would require the deployment of some other sort of suspension mechanism, such as air bearings. Operation at this lower speed on the main guideway would only happen when there is a failure and the vehicle is stopping. Thus it is possible to reconfigure the propulsion system for lift, as explained earlier. The timing of the inverter switches is changed so that the relative direction of current flow in the upper $1410_U$ and lower $1410_L$ windings are reversed and propulsive forces are created that cancel but lift forces are created that add. Since a reasonable pole pitch is 10/3 times a reasonable pole width, the lift force can be about two thirds of a g, almost enough to provide complete lift. The result is that the vehicle can slow to 5 m/s (11 miles per hour) before it is necessary to deploy the supplemental suspension system, such as air bearings.

At stations the same idea can be carried further to provide complete lift. On acceleration and deceleration lanes, there is not as much need for speed as there is for force, so a different guideway propulsion system can be provided that allows twice as much current but only one fourth the voltage. This actually reduces the power of the inverters while creating enough current capability to provide complete lift. At stations the figure-eight guidance loops 1170 would be actively controlled to provide the guidance when the induced current guidance is ineffective.

Alternative Propulsion System Using Helical Windings

The standard rectangular meander winding scheme, used for almost a century for rotary and linear motors, has been used above in connection with the baseline LSM design. This apparatus uses alternating vertical 1412 and horizontal 1414 sections of the conductor 1410 in the guideway. The vertical sections 1412 develop horizontal propulsive and braking forces and the horizontal sections 1414, or end turns in the real case where the winding sections are not perfectly horizontal, develop vertical up and down forces. This winding method is well suited to rotary machines with a laminated steel core because the windings can fit in slots while the end turns wrap around the shaft.

For air core machines there is no need to fit windings in slots and it is difficult to find a good place for the overlapping end turns. A reasonable guiderail girder for use with the suspension system of the invention experiences considerable congestion among the suspension, guidance, and propulsion conductors. The congestion makes it difficult to use an aluminum winding for the LSM, and it leads to higher fabrication costs.

It would be preferable for the propulsion conductors 1410 to be thin in the direction transverse of the guiderail so that the conductors can all be exposed to a high flux level without interfering with the suspension ladders 412, 406 and the paired figure-eight guidance loops 1170. An alternative to the rectangular meander winding is a "helical" meander winding. Such windings have been suggested for superconducting generators, and now virtually all rotary superconducting machines use a helical winding. This winding scheme appears to have advantages for Maglev propulsion applications.

Figure 16A:
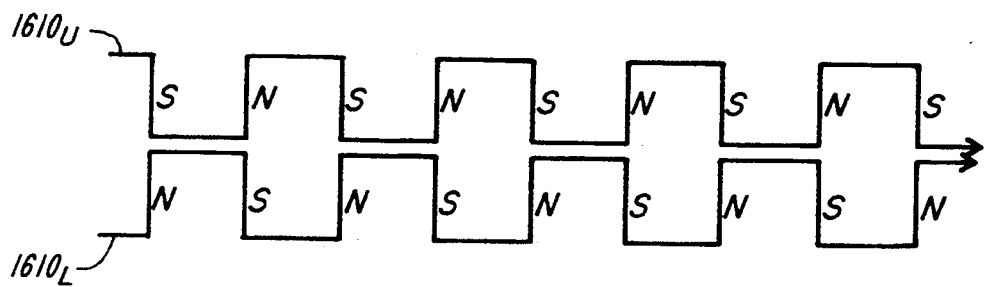
FIG. 16A shows schematically a rectangular meander conductor for use in a linear synchronous motor.
Figure 16B:
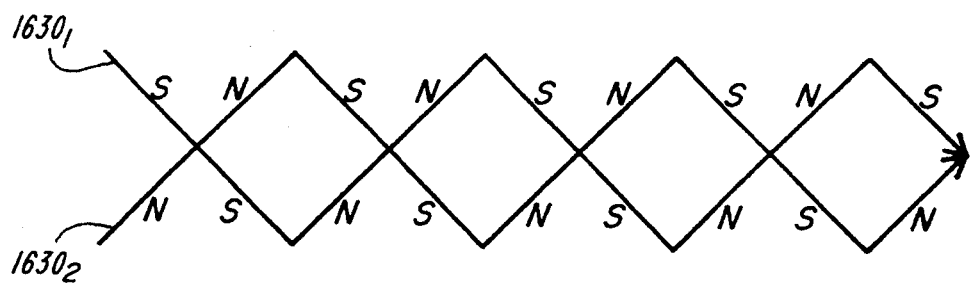
FIG. 16B shows schematically a helical meander conductor for use in a linear synchronous motor.

A simplified comparison of rectangular 1610 and helical 1630 windings for a LSM is shown in FIGS. 16A and 16B. The helical winding 1630 intercepts less flux but the winding follows a shorter total path and typically provides superior propulsion performance for the same cost. The helical winding has the added virtue of being thin so that it can be closer to the vehicle and hence in a region of higher magnetic flux density. Additionally, aluminum conductors can be used without paying a large premium in flux reduction due to the added conductor volume.

Figure 17:
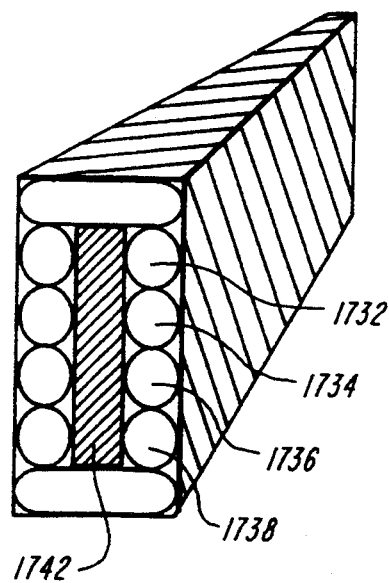
FIG. 17 shows schematically in perspective view a helical meander conductor for use in a linear synchronous motor.

A perspective view of a helical coil is shown in FIG. 17. Several wires 1732, 1734, 1736, 1738 are wound together in helical fashion in a single layer around a cylindrical core 1742, and then core 1742 is removed and the winding flattened. The resulting structure resembles a braided belt. This winding can be fabricated in a factory and long lengths can be transported on a reel to the site for field installation.

FIG. 17 shows a winding with ten conductors 1432, 1434, etc. and would be used with a 5 phase inverter. However, the winding can be fabricated for almost any number of phases. Unlike the rectangular design described above, dual phase windings (i.e. upper and lower windings) are not required, to eliminate flux linkage to the guidance and suspension conductors because each conductor 1430 traverses both the upper and lower regions. The flux canceling objective of the dual winding is still obtained, but without the added complexity of separate windings.

In a preferred embodiment, each conductor 1432, 1434, etc., shown as having a cylindrical cross-section in FIG. 17, is actually a Litz wire composed of many strands of fine wire, to minimize eddy current losses due to the rapidly changing magnetic field produced by the moving vehicle. Several companies have automated machines for making this helical Litz wire.

In addition to being a thin winding, the helical design has insulating advantages for high voltage applications. It is believed that transmission line voltages can be generated directly by this winding. In the design set forth above, the voltage between adjacent wires can be limited to about 5 kV while allowing up to 15 kV between non adjacent wires. Still another advantage is the reduced inductance of the helical winding.

The helical winding can be installed with almost any number of conductors, and without much extra cost for adding more phases. This allows the option of installing 12 phase windings and allowing adjacent phases to be connected either in series or in parallel. Rotary motors used for propulsion have been switched in series parallel combinations for many decades and the advantages are well known. Higher motor currents at lower speed can be allowed when the induced voltage is low, and lower currents can be allowed when the voltage is high.

The Guiderail

The guideway structure consists of a girder that makes up the guiderail 104 and support frames 190 (FIG. 1C). The guideway conductors that provide suspension, guidance and propulsion are mounted in starboard and port mounting units 180, 182 on either side of the guiderail 104. The guiderail is a hollow box beam. A reasonable size for such a guiderail is approximately 1,100 mm (43 inches) wide and 1,800 mm (70 inches) tall, with the hollow central portion being approximately 800 mm (31 inches) wide and 1,300 mm (51 inches) tall. The upper half of the guiderail is exposed to magnetic fields generated by the vehicle magnets 408. This necessitates using a non-magnetic reinforcement in the upper part of the girder section. A suitable reinforcement material is fiber reinforced plastic ("FRP").

Use of the paired magnets, being paired both vertically and horizontally with magnets of opposite polarity, limits the excursion of the magnetic field toward the guideway, in addition to up into the passenger compartment. Thus, the region in which steel can not be used is smaller than it would be, had single magnets been used. It is also possible to selectively place ferromagnetic material in the region of magnetic flux, to channel the location of the magnetic field, to further limit its excursion. Such ferromagnetic material may be either in the guiderail or in the vehicle.

Steel reinforcement can be used in the lower section of the guiderail. Both reinforcement types resist shear and torsional stresses. Bending stresses can be taken by conventional prestressing steel located in the lower half of the guiderail 104. The supports may be poured concrete with steel reinforcement.

The suspension, guidance and propulsion windings are mounted on the guiderail 104 within the mounting units 180, 182. The conductors are copper and aluminum and are exposed to significant pulsating forces, which must be transferred to the guideway. Typically, non-magnetic and non-conducting mounting hardware should be used. As shown in FIG. 18, a single (starboard) mounting unit 182 includes a bracket 1830, which is spaced from the edge 1814 of guiderail 104, by shims 1832. FRP bars 1836 run lengthwise of the guiderail 104 to support the various elements. Bolts 1838 secure the bracket 1830 to the guiderail 104. A cover plate 1834 encloses the mounting bracket and other apparatus.

The enclosure of the cover makes up mounting unit 182, which houses the suspension ladder 412. The ladder 412 is fabricated of high strength aluminum alloy of good conductivity. Individual sections are extruded and then bonded together as described above to form the ladder. The enclosure also houses one figure-eight 1170$_s$ of a guidance figure-eighty-eight. The conductor 1176 that connects the starboard figure-eight 1170$_s$ to a port companion passes through a conduit 1810. The propulsion windings 1850 of a six phase winding are mounted to the free face of mounting bracket 1830. Due to the manner in which the cross section is taken, only four phases are visible.

Figure 23:
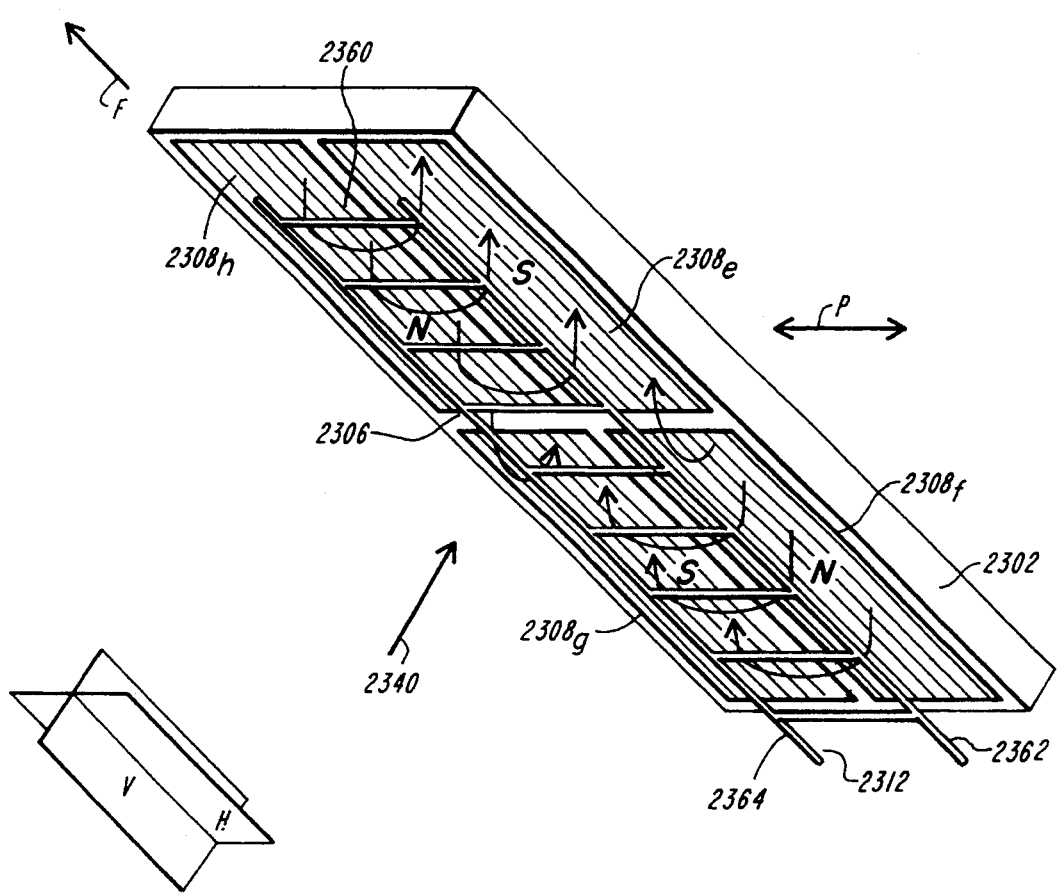
FIG. 23 shows schematically another embodiment of a guidance apparatus of the invention.

As has been mentioned above, the apparatus of the invention may also be configured to provide guidance forces from port to starboard, rather than suspension forces. An embodiment of the invention suitable for this use is shown schematically in FIG. 23. FIG. 23 shows the magnets 2308, which would be carried by the vehicle, and the guideway guidance ladder 2312. The guiderail is not shown. For the guidance configuration, only one ladder 2312 is used, rather than two, as in the suspension configuration.

This embodiment is very similar to the configuration used for suspension, except that it is rotated 90°. The poles of the magnets 2308 are aligned generally vertically, i.e. perpendicular to the motion of the vehicle and the port to starboard directions. It will be understood that, because the magnets are aligned differently with respect to the vehicle than are the magnets used in the suspension configuration, it is not easily possible to use the same magnets for both the suspension and this embodiment of guidance apparatus in the same vehicle.

This configuration keeps the vehicle close to the equilibrium position, where no current is flowing in the guideway guidance ladder 2312. As was explained above, no current is supplied to the ladder 2312. Normally, the vehicle is positioned symmetrically with respect to the ladder from port to starboard, so that each of the two magnets 2308$_e$ and 2308$_h$ of a pair of magnets are linked to an equal degree to the ladder 2312. However, if the train is displaced to one side or the other, one of the magnets will become more tightly coupled to the ladder. This will establish a current circulating throughout the ladder, as discussed above. The current will be in a direction that will establish a magnetic field, which will interact with the magnetic field from the magnets 2308$_e$ and 2308$_h$ so that the vehicle is pulled back to the equilibrium position.

The amount of force necessary for guidance is much less than that required for suspension. Therefore, the size of the guideway ladder will differ from that of the ladder used for the suspension configuration.

Variations of the basic ideas of the invention can be made while remaining within the scope of the invention, as set forth in the appended claims.

For instance, rather than a continuous ladder construction, as described above, the paired magnet configuration can be used with a guideway suspension conductor that is made up of discrete loops, rather than a ladder. This is shown schematically in FIG. 22. Discrete loops 2206 are attached to the guiderail in the same position as would be a ladder. The conductor sections that are aligned vertically with the vehicle perform the same function as the rungs of the ladder conductor, and the conductor sections that are aligned with the direction of travel perform the same function as the rails of the ladder. The discrete coil construction may be more difficult and more costly to fabricate and install. The discrete coil embodiment is typically less efficient than the ladder embodiment, because longer conductors are used to carry the suspension current. Thus, less total material is required.

Using a ladder, it is easier to tailor the lift to drag ratio than it would be with either a continuous sheet or discrete coils.

Figure 21:
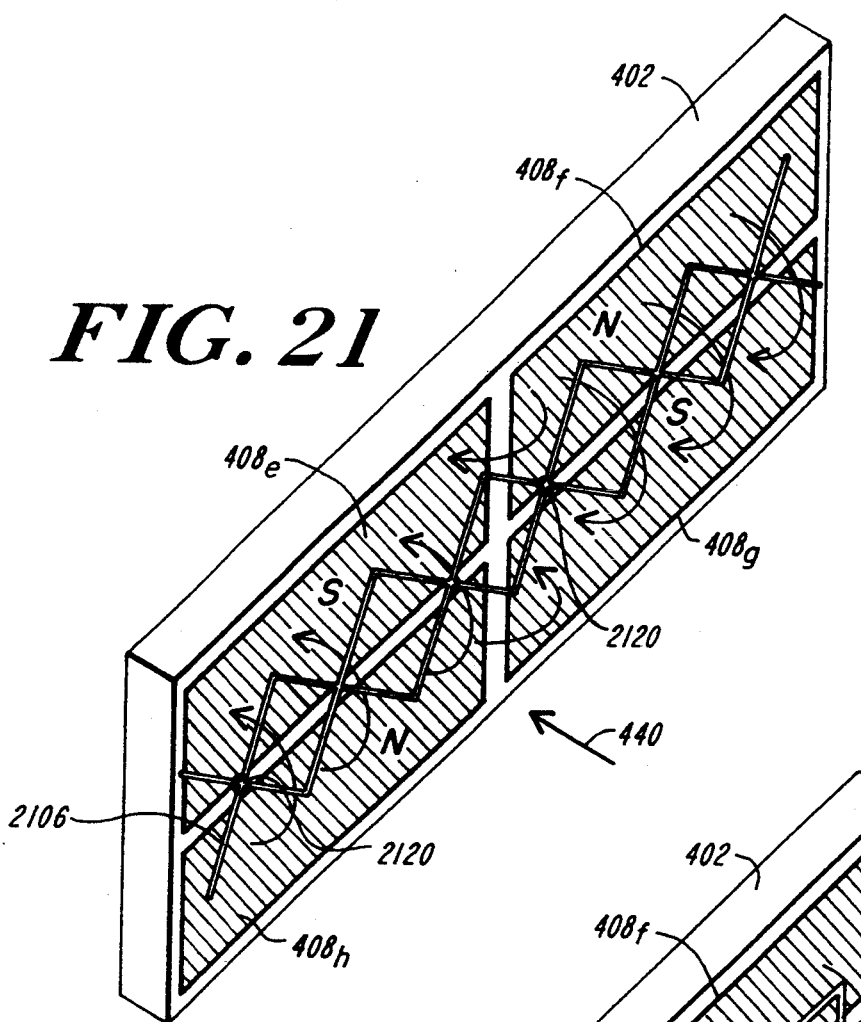
FIG. 21 shows schematically an embodiment of the suspension apparatus of the invention using a helical meander conductor rather than a ladder.

In general, if the upper and lower vehicle magnets are identical, they are on opposite sides of a roughly horizontal vehicle plane of symmetry. Similarly, the guideway conductor should have upper and lower portions that are roughly symmetric to each other with respect to a horizontal plane of symmetry. Another embodiment of the invention, shown schematically in FIG. 21, uses a helical winding for the guideway suspension conductors, rather than a ladder. The helical winding 2106 is arranged symmetrically with respect to the vehicle coils 408, in the same manner as is the ladder in the ladder configuration. The conductors of the helical winding are shorted together at intervals 2120 along their length to provide a circuit path. The path of the helical winding can be resolved into components parallel to the direction of travel of the vehicle, analogous to the rails of the ladder, and into components parallel to the action of the force of gravity. The conductor components that are aligned parallel to the force of gravity perform the same function as the rungs of the ladder conductor, and the conductor components that are aligned with the direction of travel perform the same function as the rails of the ladder.

It is also possible to use vehicle magnets that differ in strength, for instance using an upper magnet that has a weaker magnetic field than the lower magnet. In such a situation, the relative position between the vehicle and the guiderail where there is no current induced in the guideway conductors will not be the symmetry position, but, rather will be an off symmetry position. Such an embodiment may be useful to minimize the excursion of magnetic fields into undesirable locations, such as the passenger compartment or the guiderail.

Another variation in the invention relates to the relation between the vehicle magnets and the guideway. Rather than the guideway being a mono-rail around which the vehicle wraps, the guideway may be a channel, with the vehicle traveling between a pair of sidewalks. In such a configuration, the 4-pack of vehicle magnets shown in FIG. 5 are carried on the port side of the vehicle, and face the port side wall, which carries the guideway suspension conductor, for instance a ladder 460 as shown. The starboard side of the vehicle would also carry a 4-pack of magnets, which would interact with a guideway suspension ladder fixed to the starboard side wall. The suspension apparatus would function the same as in connection with a monorail. It may be necessary to make some adjustments to the propulsion and guidance apparatus, particularly the guidance apparatus, which has loops that are electrically interconnected through the guiderail.

The invention has been described in connection with vehicle magnets that are grouped in 4-packs. However, the invention may also be practiced with pairs of only two magnets, stacked vertically above one another. This would still provide the suspension force exactly as described above. Further, the stacked configuration would serve to minimize the excursion of the magnetic field into the passenger compartment. However, additional benefit with regard to minimization of the field excursion is provided by using more than one pair of vertically stacked magnets, due to the end effect phenomena discussed above.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

Having described the invention, what is claimed is:

1. An apparatus for positioning a ground vehicle that travels along a guideway at a preselected position relative to the guideway, orthogonal axes designated "vertical" and "transverse" and a horizontal plane being defined relative to said guideway, said apparatus comprising:
    a. carried by said vehicle, a first means for generating a first vehicle magnetic field, having its poles aligned transverse of the guideway;
    b. carried by said vehicle, a second means for generating a magnetic field, adjacent to and vertically above said first magnetic field means, having its poles aligned parallel to and opposite to said poles of said first magnetic field means; and
    c. fixed to said guideway, passive, electrically conductive means, having a plurality of conductive loops, for Generating a guideway magnetic field to interact with said first and second vehicle magnetic fields to maintain said vehicle at said preselected position;

whereby said first and second vehicle magnetic field means are on opposite sides of a horizontal vehicle plane of symmetry.

2. The vehicle positioning apparatus of claim 1, said preselected position being a position along a vertical axis of perturbation.

3. The vehicle positioning apparatus of claim 2, said guideway magnetic field means comprising a first upper portion and a second lower portion, symmetric to said first portion with respect to a horizontal guideway plane of symmetry.

4. The vehicle positioning apparatus of claim 3, said guideway magnetic field means comprising a ladder, having at least two elongated rails, continuously conductive along their lengths, and a plurality of rungs, arranged with said rails parallel to the direction of travel of said vehicle and said rungs aligned generally vertically relative to said guideway.

5. The vehicle positioning apparatus of claim 4, said vehicle magnetic field means and said guideway magnetic field means having nominal relative operating positions with said vehicle plane of symmetry below said guideway plane of symmetry, such that current is induced in said guideway magnetic field means which interacts with said magnetic field generated by said first and second vehicle magnetic field means to apply an upward force to said vehicle.

6. The vehicle positioning apparatus of claim 4, said vehicle magnetic field means and said guideway magnetic field means having nominal relative operating positions such that if said plane of symmetry is above said guideway plane of symmetry, current is induced in said guideway magnetic field means which interacts with said magnetic field generated by said first and second vehicle magnetic field means to apply a downward force to said vehicle.

7. The vehicle positioning apparatus of claim 3, said guideway magnetic field means comprising a plurality of discrete coils, each coil lying generally in a vertical plane relative to said guideway and parallel to the direction of travel of said vehicle.

8. The vehicle positioning apparatus of claim 3, said guideway magnetic field means comprising at least two helically meandering windings, whereby the at least two helical windings are electrically connected to each other at intervals along their length.

9. The vehicle positioning apparatus of claim 1, further comprising at least one set of figure-eight coils carried by said guideway, arranged with one of the two lobes of the figure-eight lying above the other in a vertical plane parallel to the direction of travel of said vehicle.

10. An apparatus for positioning a ground vehicle along an axis of perturbation that travels along a guideway, said apparatus comprising an electrically conductive ladder, fixed to said guideway, having at least two rails and a plurality of rungs, arranged with said rails generally parallel to the direction of vehicle travel and said rungs generally parallel to said axis of perturbation, said ladder comprising a plurality of electrically conductive sheets laminated together and electrically insulated from each other, arranged with their thin dimension perpendicular to the direction of vehicle travel and perpendicular to the axis of perturbation.

11. The apparatus of claim 10, wherein sections of said sheets are open periodically along their length in the direction of vehicle travel, defining said at least two rails and said plurality of rungs remain.

12. The apparatus of claim 11, further wherein said rungs are slit through all of said laminated sheets, so that current is impeded from flowing directly between adjacent rungs without first flowing through a portion of one of said plurality of rails.

13. The apparatus of claim 10, a vertical axis being defined relative to said guideway, wherein said axis of perturbation is vertical.

14. The apparatus of claim 10, wherein said axis of perturbation is transverse of said guideway.

15. An apparatus for positioning a ground vehicle that travels along a guideway at a selected position along an axis of perturbation relative to said guideway, said apparatus comprising:
    a. carried by said vehicle, a first means for generating a first vehicle magnetic field, having its poles aligned perpendicular to the travel path of said vehicle and to the axis of perturbation;
    b. carried by said vehicle, a second means for generating a magnetic field, adjacent to said first magnetic field means along said axis of perturbation, having its poles aligned parallel and opposite to said poles of said first magnetic field means, whereby said first and second vehicle magnetic field means are on opposite sides of a vehicle plane of symmetry; and
    c. fixed to said guideway, passive, electrically conductive means, having a plurality of conductive loops, for generating a guideway magnetic field to interact with said first and second vehicle magnetic fields to maintain said vehicle at said selected position.

16. The vehicle positioning apparatus of claim 15, said guideway magnetic field means comprising a first portion and a second portion, symmetric to said first portion with respect to a guideway plane of symmetry that is perpendicular to said axis of perturbation.

17. The vehicle positioning apparatus of claim 16, said guideway magnetic field means comprising a ladder, having at least two elongated rails, continuously conductive along their lengths, and a plurality of rungs, arranged with said rails parallel to the direction of travel of said vehicle and said rungs generally parallel to the axis of perturbation.

18. The vehicle suspension apparatus of claim 17, said vehicle magnetic field means and said guideway magnetic field means arranged so that if said vehicle plane of symmetry is not at the same location as said guideway plane of symmetry along the axis of perturbation, a current is induced in said guideway magnetic field means which interacts with said magnetic field generated by said first and second vehicle magnetic field means to apply a force to the vehicle that tends to urge the vehicle plane of symmetry toward said guideway plane of symmetry.

19. The vehicle suspension apparatus of claim 17, said vehicle magnetic field means and said guideway magnetic field means arranged so that if said vehicle plane of symmetry is at the same location as said guideway plane of symmetry along the axis of perturbation, no current is induced in said guideway magnetic field means.

20. An apparatus for positioning a ground vehicle that travels along a guideway at a selected lateral position relative to the guideway, a vertical axis being defined relative to said guideway, said apparatus comprising:
   a. carried by said vehicle, a first means for generating a first vehicle magnetic field, having its poles aligned perpendicular to the travel path of said vehicle and to the lateral dimension of said guideway;
   b. carried by said vehicle, a second means for generating a magnetic field, adjacent to said first magnetic field means, having its poles aligned parallel and opposite to said poles of said first magnetic field means and on the opposite side of a vertical plane of symmetry of the vehicle; and
   c. fixed to said guideway, passive electrically conductive means, having a plurality of conductive loops, for generating a guideway magnetic field to interact with both said first and second vehicle magnetic fields to maintain said vehicle at said selected position.

21. The vehicle positioning apparatus of claim 20, said guideway magnetic field means comprising a first portion and a second portion, symmetrical to said first portion with respect to a vertical plane of symmetry of the guiderail.

22. The vehicle positioning apparatus of claim 21, said guideway magnetic field means comprising a ladder, having at least two rails and a plurality of rungs, arranged with said rails parallel to the direction of travel of said vehicle and said rungs arranged generally transverse of said guideway.

23. The vehicle positioning apparatus of claim 22, said vehicle magnetic field means and said guideway magnetic field means arranged so that if said vehicle plane of symmetry and said guideway plane of symmetry are at different positions transverse of the guideway, a current is induced in said guideway magnetic field means which interacts with said magnetic field generated by said first and second vehicle magnetic field means to apply a force to said vehicle in a direction to urge said vehicle and said guideway lines of symmetry toward each other.

24. The vehicle positioning apparatus of claim 22, said vehicle magnetic field means and said guideway magnetic field means arranged so that if said vehicle plane of symmetry and said guideway plane of symmetry are at the same position transverse of the guideway, no current arises in the guideway magnetic field means.

25. The vehicle positioning apparatus of claim 21, said guideway magnetic field means comprising a plurality of discrete coils, each coil arranged in a generally horizontal plane along said guideway.

26. The vehicle positioning apparatus of claim 21, said guideway magnetic field means comprising at least two helically meandering windings, whereby the at least two helical windings are electrically connected to each other at intervals along their length.

27. An apparatus for positioning a ground vehicle that travels along a guideway at a selected position along an axis of perturbation relative to said guideway, said apparatus comprising:
   a. carried by said vehicle, a first means for generating a first vehicle magnetic field having its poles aligned along a first axis;
   b. carried by said vehicle, a second means for generating a magnetic field, having its poles aligned parallel to said first axis and spaced away from said first axis;
   c. fixed to said guideway, electrically conductive means, having a plurality of conductive loops, for generating a guideway magnetic field to interact with both said first and second vehicle magnetic fields;

wherein said first and second vehicle magnetic field means and said guideway magnetic field means are arranged such that if said vehicle is at a first position relative to said guideway, voltages are induced in said guideway magnetic field means by each of said vehicle magnetic field means, which are equal and opposite, and whereby no current is generated in said guideway magnetic field means.

28. The apparatus for positioning of claim 27, further wherein said first and second vehicle magnetic field means and said guideway magnetic field means are arranged such that if said vehicle is at a second position relative to said guideway, voltages are induced in said guideway magnetic field means by each of said vehicle magnetic field means, which are not equal, and whereby a current is generated in said guideway magnetic field means that interacts with said magnetic fields of said vehicle magnetic field means to apply a force to said vehicle to tend to push said vehicle toward said first position.

* * * * *